US 012452954B2

(12) United States Patent
Lee et al.

(10) Patent No.: US 12,452,954 B2
(45) Date of Patent: *Oct. 21, 2025

(54) ENHANCED CONNECTION RELEASE TECHNIQUES FOR WIRELESS COMMUNICATIONS SYSTEMS

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Satashu Goel, San Diego, CA (US); Ertugrul Necdet Ciftcioglu, North Reading, MA (US); Shanshan Wang, San Diego, CA (US); Daniel Amerga, San Diego, CA (US); Karthik Venkatram, San Diego, CA (US); Juan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,135

(22) Filed: Feb. 29, 2024

(65) Prior Publication Data

US 2025/0031274 A1 Jan. 23, 2025

Related U.S. Application Data

(63) Continuation of application No. 18/186,681, filed on Mar. 20, 2023, now Pat. No. 11,924,910, which is a
(Continued)

(51) Int. Cl.
*H04W 4/00* (2018.01)
*H04W 24/10* (2009.01)
(Continued)

(52) U.S. Cl.
CPC ............ *H04W 76/38* (2018.02); *H04W 24/10* (2013.01); *H04W 52/0216* (2013.01); *H04W 52/0261* (2013.01); *H04W 68/005* (2013.01)

(58) Field of Classification Search
CPC ................................ H04W 76/38; H04W 24/10
See application file for complete search history.

(56) References Cited

U.S. PATENT DOCUMENTS 5,708,656 A * 1/1998 Noneman ............. H04J 3/1682
370/335
7,542,458 B2 6/2009 Lioy et al.
(Continued)

FOREIGN PATENT DOCUMENTS

CN 111183706 A 5/2020
ES 2896335 T3 * 2/2022 ............ H04W 12/06
(Continued)

OTHER PUBLICATIONS

3Gpp, "3rd Generation Partnership Project, Technical Specification Group Radio Access Network, Evolved Universal Terrestrial Radio Access (E-UTRA), Radio Resource Control (RRC), Protocol specification (Release 13)", 3GPP Standard, 3GPP TS 36.331, 3rd Generation Partnership Project (3GPP), 650, Route Des Lucioles, F-06921 Sophia-Antipolis Cedex, France, No. V13.0.0, Dec. 2015 (Dec. 2015), Jan. 6, 2016, XP051047501, pp. 1-507, pp. 272, 375, 381, 304 to 306 and 309.
(Continued)

*Primary Examiner* — Elisabeth Benoit Magloire
(74) *Attorney, Agent, or Firm* — Dalei Dong; Holland & Hart LLP

(57) ABSTRACT

Methods, systems, and devices for wireless communications are described. A user equipment (UE) may receive, from a base station, control signaling for communications in a wireless communications system. The control signaling may indicate a first duration for an inactivity timer. The UE may
(Continued)

initiate the inactivity timer and a second timer based on identifying a period of inactivity. The second timer may have a second duration that is shorter than the first duration for the inactivity timer. In some examples, the second duration may be based on one or more parameters, such as a display status, a battery status, a scaling factor, the first duration, an application state, or any combination thereof. The UE may release a connection for the communications in the wireless communications system based on an expiration of the second timer, an expiration of the inactivity timer, or a combination thereof.

30 Claims, 12 Drawing Sheets

Related U.S. Application Data continuation of application No. 17/351,999, filed on Jun. 18, 2021, now Pat. No. 11,622,414.

(60) Provisional application No. 63/053,306, filed on Jul. 17, 2020.

(51) Int. Cl.
*H04W 52/02* (2009.01)
*H04W 68/00* (2009.01)
*H04W 76/38* (2018.01)

(56) References Cited

U.S. PATENT DOCUMENTS

| | | | |
|---|---|---|---|
| 8,260,372 | B2 | 9/2012 | Haumont |
| 8,582,483 | B1 | 11/2013 | Yu et al. |
| 9,743,459 | B2 | 8/2017 | Shah et al. |
| 10,051,568 | B2 | 8/2018 | Alon et al. |
| 10,887,073 | B2 | 1/2021 | Zhou et al. |
| 11,026,107 | B2 | 6/2021 | You et al. |
| 11,622,414 | B2 | 4/2023 | Lee |
| 2013/0039339 | A1* | 2/2013 | Rayavarapu .......... H04W 76/19 370/329 |
| 2013/0122918 | A1 | 5/2013 | Boley et al. |
| 2013/0242833 | A1 | 9/2013 | Ahn et al. |
| 2013/0260811 | A1* | 10/2013 | Rayavarapu .......... H04W 76/19 455/509 |
| 2014/0064134 | A1 | 3/2014 | Huang et al. |
| 2014/0198699 | A1 | 7/2014 | Makharia et al. |
| 2014/0204820 | A1 | 7/2014 | Wittberg et al. |
| 2014/0269637 | A1 | 9/2014 | Banister et al. |
| 2014/0281283 | A1* | 9/2014 | Shacham .............. G06F 1/3225 711/149 |
| 2014/0307659 | A1 | 10/2014 | Kweon et al. |
| 2016/0198519 | A1 | 7/2016 | Wang et al. |
| 2016/0286486 | A1* | 9/2016 | Nobusawa ............ H04W 72/23 |
| 2016/0286603 | A1 | 9/2016 | Vajapeyam et al. |
| 2017/0127471 | A1* | 5/2017 | Yu .......................... H04W 76/30 |
| 2017/0303236 | A1 | 10/2017 | Sun et al. |
| 2018/0124864 | A1* | 5/2018 | Lee ................... H04W 52/0209 |
| 2019/0053162 | A1 | 2/2019 | Islam et al. |
| 2019/0053324 | A1 | 2/2019 | Tseng et al. |
| 2019/0059056 | A1 | 2/2019 | Islam et al. |
| 2019/0132109 | A1 | 5/2019 | Zhou et al. |
| 2019/0191483 | A1 | 6/2019 | Ryoo et al. |
| 2019/0254104 | A1 | 8/2019 | Gurumoorthy et al. |
| 2019/0268966 | A1 | 8/2019 | Kollar et al. |
| 2020/0037248 | A1 | 1/2020 | Zhou et al. |
| 2020/0053825 | A1 | 2/2020 | Hwang et al. |
| 2020/0229099 | A1 | 7/2020 | He et al. |
| 2020/0288488 | A1 | 9/2020 | Park et al. |
| 2020/0288494 | A1* | 9/2020 | Heo ....................... H04W 72/21 |
| 2020/0359247 | A1 | 11/2020 | Yi et al. |
| 2022/0022282 | A1 | 1/2022 | Lee et al. |
| 2022/0150833 | A1 | 5/2022 | Li |
| 2022/0201522 | A1 | 6/2022 | Tao et al. |
| 2023/0232495 | A1 | 7/2023 | Lee et al. |

FOREIGN PATENT DOCUMENTS

| | | | | |
|---|---|---|---|---|
| ES | | 2896920 T3 * | 2/2022 | ........ H04W 52/0254 |
| TW | | 201347576 A * | 11/2013 | ......... H04L 41/0893 |
| WO | WO-2016019112 | | 2/2016 | |
| WO | WO-2019216663 A1 | | 11/2019 | |

OTHER PUBLICATIONS

International Preliminary Report on Patentability—PCT/US2021/041694—The International Bureau of WIPO—Geneva, Switzerland—Jan. 26, 2023.

International Search Report and Written Opinion—PCT/US2021/041694—ISA/EPO—Oct. 13, 2021.

Kyonjiu, "3rd Generation Partnership Project (3GPP), Technical Specification Group (TSG) RAN, Working Group 2 (WG2), RRC Protocol Specification", TS 25.331, V1.5.0, (Sep. 1999), TSG-RAN meeting #5, Oct. 6-8, 1999, pp. 1-222.

LTE: Evolved Universal Terrestrial Radio Access (E-UTRA), Medium Access Control (MAC) protocol specification, 3GPP TS 36.321, version 13.0.0, Release 13, ETSI TS 136 321 V13.0.0 (Feb. 2016), 84 Pages.

Qian F., et al., "TOP: Tail Optimization Protocol For Cellular Radio Resource Allocation", 2010 18th IEEE International Conference on Network Protocols (ICNP), IEEE, Oct. 5, 2010 (Oct. 5, 2010), pp. 285-294, XP031864737, DOI: 10.1109/ICNP.2010.5762777, ISBN: 978-1-4244-8644-1 the whole document.

* cited by examiner

ENHANCED CONNECTION RELEASE TECHNIQUES FOR WIRELESS COMMUNICATIONS SYSTEMS

The present application for patent is a continuation of U.S. patent application Ser. No. 18/186,681 filed Mar. 20, 2023, which is a continuation of U.S. patent application Ser. No. 17/351,999 filed Jun. 18, 2021, which claims the benefit of U.S. Provisional Patent Application No. 63/053,306 filed Jul. 17, 2020, each of which is assigned to the assignee hereof and each of which is expressly incorporated by reference herein.

FIELD OF TECHNOLOGY

Technical Field

The following relates generally to wireless communications and more specifically to enhanced connection release techniques for wireless communications systems.

Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may communicate in a wireless communications system. However, some such communications may be relatively inefficient. For example, the UE and the base station may not have further data to communicate, but the connection may be maintained for a relatively long time. Such examples may result in inefficient power usage and poor resource utilization.

SUMMARY

The described techniques relate to improved methods, systems, devices, and apparatuses that support enhanced connection release techniques for wireless communications systems. Generally, the described techniques enable a user equipment (UE) to implement one or more timers for efficient and reliable connection release with a base station. For example, the UE may identify a period of inactivity (e.g., the UE may finish transmitting or receiving a data communication and the UE may fail to identify further scheduled, received, or to-be transmitted communications). The UE may initiate one or more timers based on the identified period of inactivity. For example, the UE may initiate a data inactivity timer with a first duration configured by control signaling from the base station. Additionally or alternatively, the UE may initiate a second timer (e.g., an idle timer) with a second duration (e.g., shorter than the first duration).

The UE may release a connection with the base station based on an expiration of the data inactivity timer, an expiration of the second timer, or a combination thereof. For example, the UE may identify a trigger (e.g., an expiration of the second timer) and transmit an uplink message indicating a request to release the connection. In some examples, the UE may transmit a threshold quantity of such uplink messages, for example, in accordance with a third timer (e.g., the UE may refrain from transmitting a subsequent uplink message for a third duration of the third timer). The UE may monitor for a downlink message from the base station enabling the UE to release the connection based on transmitting the one or more uplink messages. In some examples, the UE may receive the downlink message and release the connection. In some other examples, the UE may fail to receive the downlink message. In such examples, the UE may refrain from transmitting further uplink messages and the UE may release the connection upon expiration of the data inactivity timer.

A method of wireless communications at a UE is described. The method may include receiving, from a base station, control signaling for communications in a wireless communications system, the control signaling indicating a first duration for an inactivity timer, initiating the inactivity timer and a second timer based on a period of inactivity, the second timer having a second duration that is shorter than the first duration for the inactivity timer, and transmitting, based on an expiration of the second timer, a first uplink message indicating a request to release a connection for the communications in the wireless communications system.

An apparatus for wireless communications at a UE is described. The apparatus may include at least one processor, memory coupled (e.g., operatively, communicatively, functionally, electronically, or electrically) to with the at least one processor, and instructions stored in the memory. The instructions may be executable by the at least one processor to cause the apparatus to receive, from a base station, control signaling for communications in a wireless communications system, the control signaling indicating a first duration for an inactivity timer, initiate the inactivity timer and a second timer based on a period of inactivity, the second timer having a second duration that is shorter than the first duration for the inactivity timer, and transmit, based on an expiration of the second timer, a first uplink message indicating a request to release a connection for the communications in the wireless communications system.

Another apparatus for wireless communications at a UE is described. The apparatus may include means for receiving, from a base station, control signaling for communications in a wireless communications system, the control signaling indicating a first duration for an inactivity timer, means for initiating the inactivity timer and a second timer based on a period of inactivity, the second timer having a second duration that is shorter than the first duration for the inactivity timer, and means for transmitting, based on an expiration of the second timer, a first uplink message indicating a request to release a connection for the communications in the wireless communications system.

A non-transitory computer-readable medium storing code for wireless communications at a UE is described. The code may include instructions executable by at least one processor to receive, from a base station, control signaling for communications in a wireless communications system, the control signaling indicating a first duration for an inactivity timer, initiate the inactivity timer and a second timer based on a period of inactivity, the second timer having a second duration that is shorter than the first duration for the inactivity timer, and transmit, based on an expiration of the second timer, a first uplink message indicating a request to release a connection for the communications in the wireless communications system.

Some examples of the method, apparatuses, and non-transitory computer-readable medium described herein may further include operations, features, means, or instructions for initiating a third timer based on transmitting the first uplink message, and monitoring, for a third duration of the third timer, for a downlink message from the base station based on transmitting the first uplink message.

Some examples of the method, apparatuses, and non-transitory computer-readable medium described herein may further include operations, features, means, or instructions for receiving the downlink message from the base station based on the monitoring, where releasing the connection for the communications may be based on receiving the downlink message.

Some examples of the method, apparatuses, and non-transitory computer-readable medium described herein may further include operations, features, means, or instructions for identifying an expiration of the third timer, and transmitting a second uplink message indicating the request to release the connection based on the expiration of the third timer and failing to receive the downlink message in the third duration of the third timer.

In some examples of the method, apparatuses, and non-transitory computer-readable medium described herein, the first uplink message includes a UE assistance information message, the third timer includes a release preference prohibit timer, the downlink message includes a radio resource control message, the control signaling indicates the third duration of the third timer, or any combination thereof.

Some examples of the method, apparatuses, and non-transitory computer-readable medium described herein may further include operations, features, means, or instructions for identifying the expiration of the inactivity timer, where releasing the connection for the communications may be in response to the expiration of the inactivity timer.

Some examples of the method, apparatuses, and non-transitory computer-readable medium described herein may further include operations, features, means, or instructions for transmitting a quantity of uplink messages each indicating a respective request to release the connection, restarting the inactivity timer after each of the quantity of uplink messages, identifying that the quantity of uplink messages satisfies a threshold, and refraining from transmitting an additional uplink message indicating the request to release the connection based on identifying that the quantity of uplink messages satisfies the threshold, where identifying the expiration of the inactivity timer may be based on refraining from transmitting the additional uplink message.

Some examples of the method, apparatuses, and non-transitory computer-readable medium described herein may further include operations, features, means, or instructions for restarting the second timer based on transmitting the first uplink message, and transmitting a second uplink message indicating the request to release the connection based on a second expiration of the second timer after restarting the second timer, an expiration of a third timer, or a combination thereof.

Some examples of the method, apparatuses, and non-transitory computer-readable medium described herein may further include operations, features, means, or instructions for applying a scaling factor to the first duration for the inactivity timer, and determining the second duration for the second timer based on applying the scaling factor to the first duration.

Some examples of the method, apparatuses, and non-transitory computer-readable medium described herein may further include operations, features, means, or instructions for identifying a maximum duration for the second timer, and comparing the candidate duration to the maximum duration, where determining the second duration for the second timer may be based on the comparing.

Some examples of the method, apparatuses, and non-transitory computer-readable medium described herein may further include operations, features, means, or instructions for identifying whether a display of the UE may be enabled or disabled, where the second duration for the second timer may be based on whether the display may be enabled or disabled.

Some examples of the method, apparatuses, and non-transitory computer-readable medium described herein may further include operations, features, means, or instructions for identifying, after initiating the second timer, a change in a display status of the UE, where the display status corresponds to whether the display may be enabled or disabled, and adjusting the second duration for the second timer based on the change in the display status.

Some examples of the method, apparatuses, and non-transitory computer-readable medium described herein may further include operations, features, means, or instructions for identifying a status of a battery for the UE, where the second duration for the second timer may be based on the status of the battery.

Some examples of the method, apparatuses, and non-transitory computer-readable medium described herein may further include operations, features, means, or instructions for identifying that an application of the UE may be closed based on an identifier of the application, where releasing the connection may be based on identifying that the application of the UE may be closed.

Some examples of the method, apparatuses, and non-transitory computer-readable medium described herein may further include operations, features, means, or instructions for initiating the second timer may be based on identifying that the application of the UE may be closed.

Some examples of the method, apparatuses, and non-transitory computer-readable medium described herein may further include operations, features, means, or instructions for refraining from transmitting, in response to the expiration of the second timer, the first uplink message indicating the request to release the connection while the application of the UE may be open, and transmitting the first uplink message based on identifying that the application of the UE may be closed.

Some examples of the method, apparatuses, and non-transitory computer-readable medium described herein may further include operations, features, means, or instructions for identifying a third duration corresponding to a time until an uplink transmission for an application of the UE, determining that the third duration satisfies a threshold duration, and enabling a connection release procedure based on the third duration satisfying the threshold duration, the connection release procedure including initiating the second timer and transmitting the first uplink message.

Some examples of the method, apparatuses, and non-transitory computer-readable medium described herein may further include operations, features, means, or instructions for identifying the threshold duration based on an application identifier of the application, the threshold duration corresponding to a latency tolerance associated with the application.

Some examples of the method, apparatuses, and non-transitory computer-readable medium described herein may further include operations, features, means, or instructions for identifying, for a set of multiple applications of the UE, a set of multiple durations each associated with a respective time until a respective uplink transmission for a respective application of the set of multiple applications, where identifying the third duration includes identifying a smallest duration of the set of multiple durations as the third duration.

Some examples of the method, apparatuses, and non-transitory computer-readable medium described herein may further include operations, features, means, or instructions for receiving, at a modem of the UE from one or more applications of the UE, an indication of the third duration, an indication of the threshold duration, or any combination thereof.

DETAILED DESCRIPTION

Figure 1:
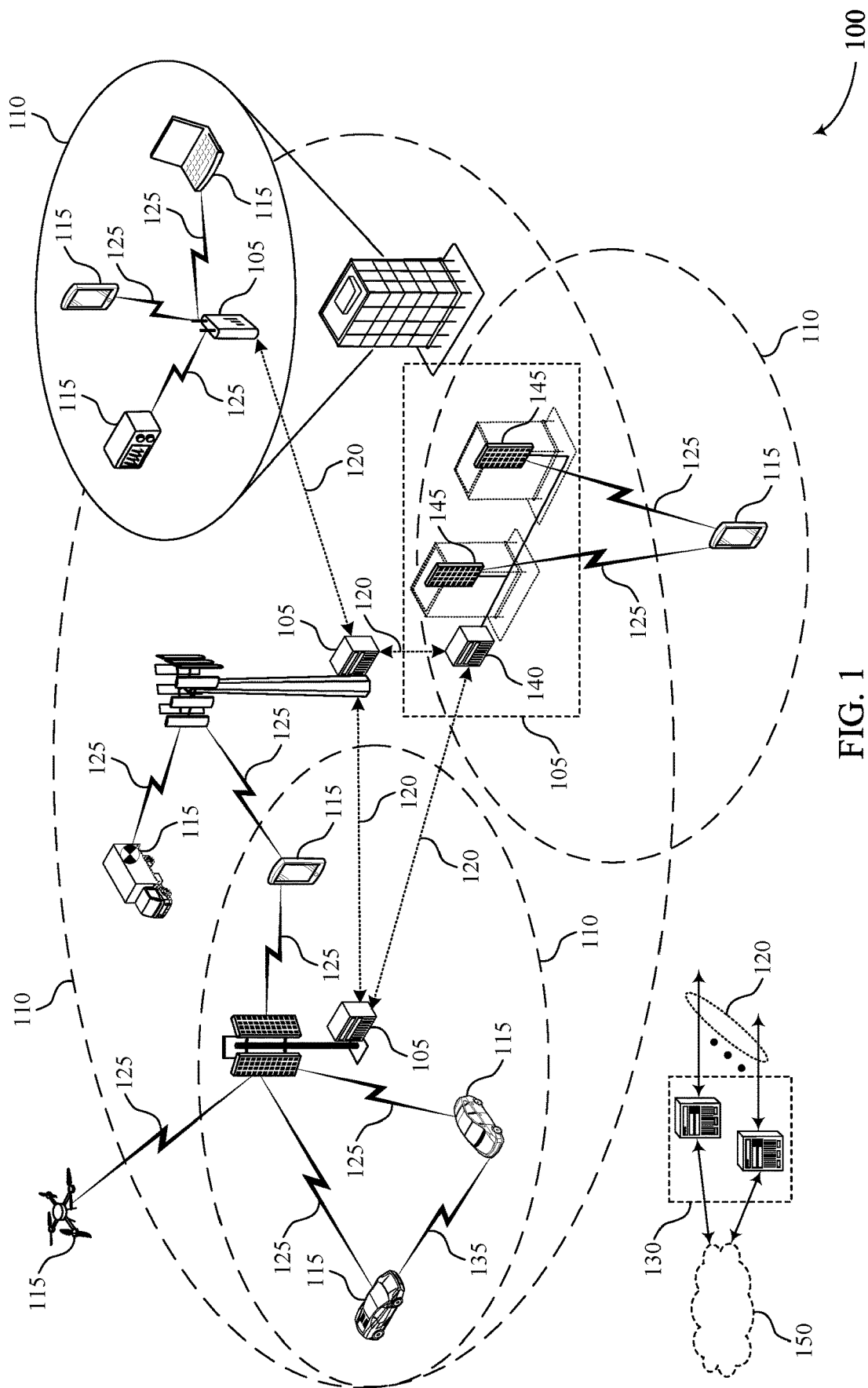
FIG. 1 illustrates an example of a system for wireless communications that supports enhanced connection release techniques for wireless communications systems in accordance with aspects of the present disclosure.

A user equipment (UE) and a base station may establish communications in a wireless communications system. For example, the UE may transmit a capability message (e.g., an uplink control message indicating UE capability information) to the base station. The base station may transmit control signaling (e.g., radio resource control (RRC) signaling) to the UE in response to the capability message. In some examples, the control signaling may configure one or more timers. For example, the control signaling may configure a data inactivity timer at the UE. The UE may be configured to release a connection with the base station upon expiration of the data inactivity timer. However, such a data inactivity timer may result in relatively inefficient communications. For example, the UE may be unable to trigger a connection release procedure and the UE may maintain the communications link for a relatively long time, which may result in high processing overhead and power consumption at the UE, relatively poor resource utilization in the wireless communications system, or both.

In accordance with the techniques described herein, an idle timer for connection release procedures may be implemented by a wireless communications system—e.g., in addition to and in some cases concurrent with the inactivity timer-which may improve communications efficiency (e.g., reduce processing overhead and power usage at the UE 115-a, ensuring reliable communications, among other benefits). For example, the UE may initiate one or more timers after communicating (e.g., receiving or transmitting) data with a base station (e.g., the UE may start the one or more timers based on identifying an inactivity period without scheduled communications). The UE may initiate a data inactivity timer with a first duration configured by control signaling from the base station (e.g., radio resource control (RRC) signaling may indicate the first duration). Additionally or alternatively, the UE may initiate an idle timer with a second duration (e.g., shorter than the first duration). In some examples, the UE may determine the duration of the idle timer based on one or more parameters. For example, the UE may scale the first duration by a scaling parameter, the UE may identify different durations for different statuses of the UE (e.g., display statuses or battery statuses), the UE may identify a minimum of the one or more parameters to use as the duration, or any combination thereof.

The UE may transmit one or more uplink messages requesting a connection release to the base station based on an expiration of the idle timer, among other examples of triggers (e.g., the UE may initiate the idle timer or transmit an uplink message based on a state of an application of the UE). For example, if the UE has not identified communications for the second duration, the UE may send a UE assistance information (UAI) message with one or more parameters indicating a desired state (e.g., an RRC state of idle, inactive, or out of connected). The UE may monitor for a downlink message for a duration of a third timer (e.g., the UE may initiate a release preference prohibit timer upon transmission of the UAI message) in response to transmitting the uplink message. For example, the UE may monitor for an RRC release message indicating to release the connection (e.g., indicating that the UE may enter the desired state). In some examples, the UE may receive the downlink message and release the connection in accordance with the downlink message. In some examples, the UE may transmit a second uplink message (e.g., a second UAI message) upon expiration of the third timer, the UE may restart the third timer based on sending the second uplink message, or both. In some examples, the UE may determine that a quantity of uplink messages sent to the base station satisfies a threshold. The UE may refrain from transmitting further UAI messages based on the satisfied threshold, which may allow the UE to release the connection based on an expiration of the data inactivity timer (e.g., by refraining from transmitting UAI messages, the UE may refrain from restarting the data inactivity timer based on sending a UAI message).

Aspects of the disclosure are initially described in the context of wireless communications systems. Aspects of the disclosure are then described in the context of timelines and process flows. Aspects of the disclosure are further illustrated by and described with reference to apparatus diagrams, system diagrams, and flowcharts that relate to enhanced connection release techniques for wireless communications systems.

FIG. 1 illustrates an example of a wireless communications system 100 that supports enhanced connection release techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, or the link, which may be implemented in various articles such as appliance, drones, robots, vehicles, meters, or the like.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further cMTC), and mMTC (massive MTC), and NB-IoT may include eNB-IoT (enhanced NB-IoT), and FeNB-IoT (further enhanced NB-IoT).

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, devices of the wireless communications system 100 may implement one or more timers as described herein. For example, a UE 115 may receive control signaling from a base station 105 establishing communications (e.g., RRC signaling indicating a duration of a data inactivity timer). The UE 115 may identify a period of inactivity (e.g., the UE 115 may finish transmitting or receiving a data communication and the UE may fail to identify further scheduled communications). The UE 115 may initiate one or more timers based on the identified period of inactivity. For example, the UE 115 may initiate a data inactivity timer with a first duration. Additionally or alternatively, the UE 115 may initiate a second timer (e.g., an idle timer) with a second duration (e.g., shorter than the first duration). In some examples, the UE 115 may identify the duration of the idle timer based on one or more parameters. For example, the UE 115 may scale the first duration by a scaling parameter, the UE 115 may identify different durations for different statuses of the UE 115 (e.g., display statuses or battery statuses), the UE 115 may identify a minimum of the one or more parameters to use as the duration, or any combination thereof.

The UE 115 may release a connection with the base station 105 based on an expiration of the data inactivity timer, an expiration of the second timer, or a combination thereof. For example, the UE 115 may identify a trigger (e.g., an expiration of the second timer) and transmit an uplink message indicating a request to release the connection. In some examples, the UE 115 may transmit a threshold quantity of such uplink messages, for example, in accordance with a third timer (e.g., the UE 115 may refrain from transmitting a subsequent uplink message for a third duration of the third timer). The UE 115 may monitor for a downlink message from the base station enabling the UE 115 to release the connection based on transmitting the one or more uplink messages. In some examples, the UE 115 may receive the downlink message and release the connection. In some other examples, the UE 115 may fail to receive the downlink message. In such examples, the UE may refrain from transmitting further uplink messages (e.g., based on the quantity of the one or more uplink messages satisfying a threshold) and the UE 115 may release the connection upon expiration of the data inactivity timer.

Figure 2:
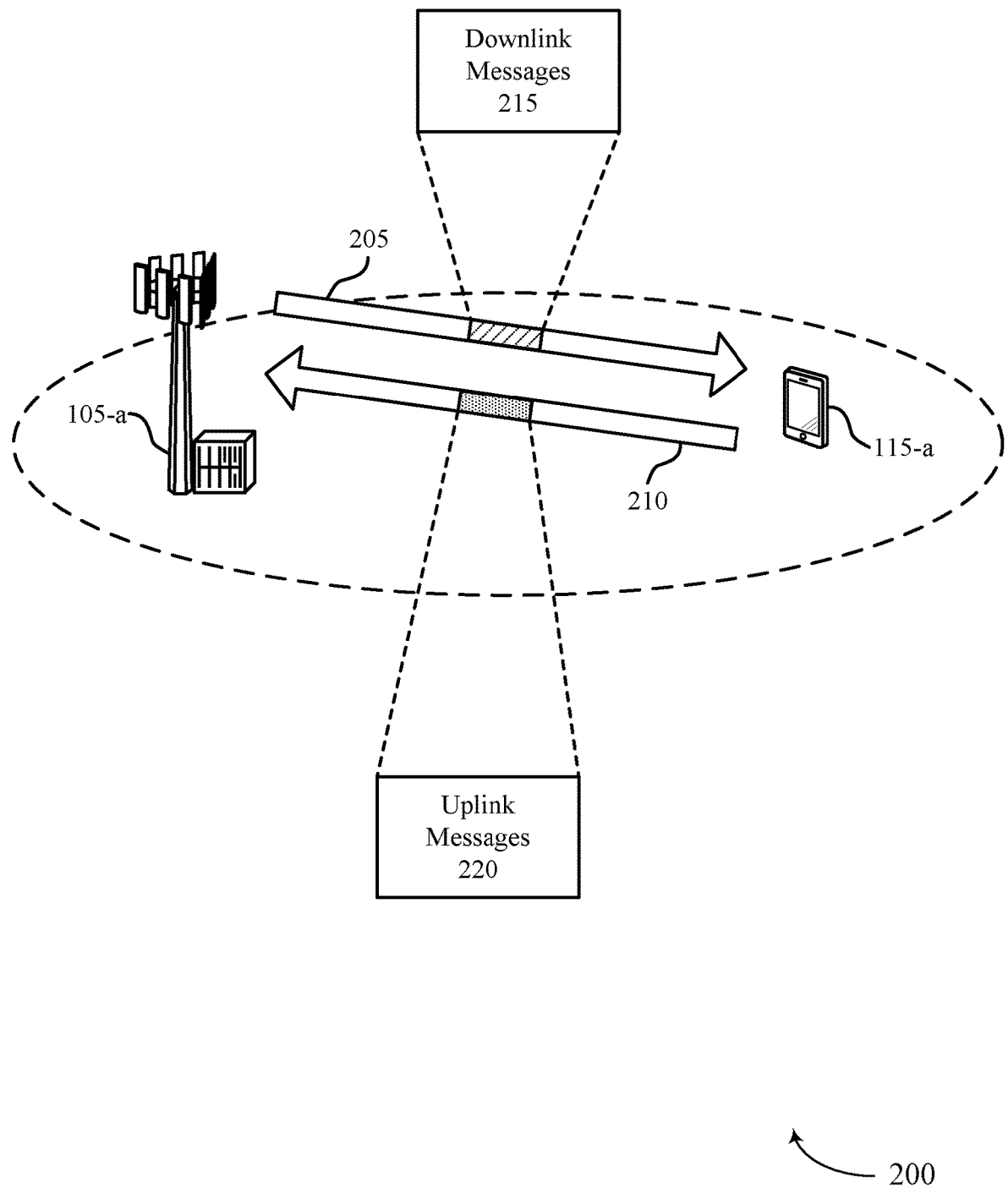
FIG. 2 illustrates an example of a wireless communications system that supports enhanced connection release techniques for wireless communications systems in accordance with aspects of the present disclosure.

FIG. 2 illustrates an example of a wireless communications system 200 that supports enhanced connection release techniques for wireless communications systems in accordance with aspects of the present disclosure. In some examples, the wireless communications system 200 may implement aspects of wireless communication system 100. For example, the wireless communications system 200 includes UE 115-a and base station 105-a, which may be examples of the corresponding devices described with reference to FIG. 1.

The UE 115-a and the base station 105-a may communicate using one or more downlink transmissions 205 and uplink transmissions 210. For example, the base station 105-a may send the downlink transmissions 205 to the UE 115-a. Additionally or alternatively, the UE 115-a may send the uplink transmissions 210 to the base station 105-a. A downlink transmission 205 may include one or more downlink messages 215 and an uplink transmission 210 may include one or more uplink messages 220.

In some examples, the base station 105-a and the UE 115-a may establish communications. For example, the UE 115-a may transmit a capability message to the base station 105-a (e.g., a UECapabilityInformation message). In some examples, the capability message may indicate a release parameter (e.g., release-Preference field in the capability message indicating a capability of the UE 115-a to enter one or more RRC states). The base station 105-a may transmit control signaling to the UE 115-a to establish the communications. For example, the base station may transmit an RRC message (e.g., an RRC Reconfiguration message) in response to the capability message. In some examples, the RRC message may include configuration information for establishing the communications. For example, one or more RRC messages may indicate one or more timers. As one example, an RRC message may include configuration information indicating a release preference prohibit timer (e.g., an RRC reconfiguration message may include an otherConfig (releasePreferenceConfig(releasePreferenceProhibitTimer)) field configuring the release preference prohibit timer with a duration), among other examples of configuration information. For example, the base station 105-a may configure the UE 115-a for sending release assistance messages, such as UAI messages, using the RRC reconfiguration message (e.g., in addition to the configuration of the release preference prohibit timer) using a setup option (e.g., SetupRelease {ReleasePreferenceConfig}), among other examples. In some cases, the release preference prohibit timer may be referred to herein as a "T346f" timer or a third timer.

Additionally or alternatively, an RRC message may include configuration information indicating a data inactivity timer. For example, an RRC reconfiguration message or a RRC Setup message may include a setup release configuration indicating a duration of the data inactivity timer (e.g., a RRCSetup (SetupRelease {DataInactivityTimer}) field may be included in the RRC message indicating a duration of the data inactivity timer, such as 1, 2, . . . , 150, or 180 seconds, among other examples of durations).

In some examples, the UE 115-a may release a connection with the base station 105-a based on an expiration of the data inactivity timer. For example, the base station 105-a may configure the data inactivity timer at a first time. The UE 115-a and the base station 105-a may communicate data using the established connection (e.g., the UE 115-a may send one or more uplink transmissions 210 to the base station 105-a or the base station 105-a may send one or more downlink transmissions 205 to the UE 115-a). The UE 115-a may identify an inactivity period and initiate the data inactivity timer. For example, the UE 115-a may finish a data communication with the base station 105-a (e.g., the UE 115-a may transmit or receive data via scheduled resources) and the UE 115-a may not have further data to communicate (e.g., the UE 115-a may identify that there are no further scheduled data communications or that the UE 115-a does not have data to communicate to the base station 105-a). The UE 115-a may initiate the data inactivity timer based on finishing the data communication. The UE 115-a may maintain the communication link with the base station 105-a for a duration of the data inactivity timer. For example, the UE 115-a may monitor for downlink messages 215 (e.g., downlink control information scheduling data communications, or RRC signaling) from the base station 105-a while the data inactivity timer is running. The UE 115-a may release the connection with the base station 105-a upon expiration of the data inactivity timer (e.g., the UE 115-a may release the connection autonomously if the UE 115-a does not identify data or receive RRC messages for the duration of the data inactivity timer).

In some examples, the UE 115-a may be configured to send an uplink message 220 in order to initiate a connection release. For example, the UE 115-a may transmit a UAI message including one or more fields indicating a request of a desired state to release a connection with the base station 105-a (e.g., the UE 115-a may send a UAI message including a releasePreference (preferredRRC-State) field indicating a request to enter an idle state, an inactive state, or an out of connected state). The UE 115-a may initiate the release preference prohibit timer based on sending the uplink message 220. For example, the UE 115-a may refrain from transmitting another UAI message for a duration of the release preference prohibit timer (e.g., 0 seconds, 0.5 seconds, 1 seconds, 20 seconds, 30 seconds, among other examples of durations).

The UE 115-a may monitor for a downlink message 215 from the base station 105-a until an expiration of the release preference prohibit timer. In some examples, the base station 105-a may transmit the downlink message 215 in response to the uplink message 220. For example, the base station 105-a may transmit an RRC release message indicating to the UE 115-a to release the connection (e.g., the RRC release message may include an optional suspendConfig field indicating to release the RRC connection to let the UE 115-a enter an idle or inactive state, among other examples of fields). The UE 115-a may release the connection based on receiving the RRC release message (e.g., the UE 115-a may enter an indicated idle, inactive, or out of connected state).

In some cases, the UE 115-a may be unable to trigger transmission of such UAI messages to request connection release. Additionally, if the UE 115-a is configured with the data inactivity timer, the UE 115-a may restart the data inactivity timer each time a UAI message is sent, which may result in relatively inefficient connection release procedures. For example, if the UE 115-a continues transmitting UAI messages and fails to receive corresponding connection release messages from the base station 105-a, the UE 115-a may be unable to release the connection based on an expiration of the data inactivity timer (e.g., the data inactivity timer may fail to expire due to being reset at each of the UAI messages).

In accordance with the techniques described herein, the UE 115-a may implement an idle timer for performing one or more connection release procedures (e.g., triggering transmission of a UAI message), which may result in relatively more efficient power usage at the UE 115-a, among other benefits. In some cases, the idle timer may be referred to herein as a second timer. The UE 115-a may initiate the idle timer based on identifying an inactivity period. For example, the UE 115-a may not have further data to receive or transmit with the base station 105-a and the UE 115-a may start the idle timer, the data inactivity timer, or both. The UE 115-a may transmit one or more uplink messages 220 based on an expiration of the idle timer. As an illustrative example, the UE 115-a may maintain the communication link with the base station 105-a for a duration of the idle timer. The UE 115-a may monitor for downlink messages 215 (e.g., downlink control information scheduling data communications or RRC signaling) from the base station 105-a while the idle timer is running. The UE 115-a may transmit a UAI message requesting a connection release (e.g., indicating a desired RRC state) upon expiration of the idle timer. The UE 115-a may monitor for a downlink message 215 releasing the UE 115-a from the connection in response to the UAI message.

The idle timer may have a duration shorter than a duration of the data inactivity timer, which may result in relatively more efficient communications. For example, a shorter idle timer duration may enable the UE 115-a to attempt to release the connection via a downlink message 215 from the base station 105-a (e.g., a network commanded release based on transmitting a UAI message upon expiration of the idle timer) rather than an autonomous connection release (e.g., due to an expiration of the data inactivity timer). Thus, the base station 105-a may be aware of the connection release and schedule further communications accordingly, which may result in reduced signaling overhead (e.g., the base station 105-a may avoid attempting to communicate with the UE 115-a due to being aware of the connection release), among other benefits.

In some examples, the idle timer may be configurable. For example, the UE 115-a may determine the duration of the idle timer based on one or more parameters (e.g., configurable parameters). As an illustrative example, the duration of the idle timer may be identified based on a scaling parameter, a duration of the inactivity timer, one or more statuses of the UE 115-a (e.g., display statuses or battery statuses), a launch state of an application of the UE 115-a, or any combination thereof. As one illustrative example, the UE 115-a may scale a duration of the inactivity timer by the scaling parameter to obtain a candidate duration for the idle timer and the UE may compare the candidate duration to a maximum duration (e.g., a configurable duration corresponding to one or more statuses of the UE 115-a). The UE 115-a may determine the duration based on the comparison (e.g., the UE 115-a may use a smaller value between the candidate duration and the maximum duration as the duration of the idle timer. As one illustrative example, the UE 115-a may calculate the duration of the idle timer using the equation idleTimer=min ($\alpha$*dataInactivityTimer, T), where idleTimer represents the duration of the idle timer, dataInactivityTimer represents the duration of a configured data inactivity timer, $\alpha$ represents a configurable scaling parameter (e.g., configured by a manufacturer of the UE 115-a, configured by control signaling from the base station 105-a, among other examples of configuring parameters), and T represents a configurable parameter (e.g., a maximum duration of the idle timer).

In some examples, the duration (e.g., length) of the idle timer may be based on a display status of the UE 115-a (e.g., a smart phone display status). For example, the maximum duration (e.g., T) may be a first value if the display is on (e.g., T1) and a second value if the display is off (e.g., T2). The second value may be relatively smaller than the first value (e.g., T2<T1), which may result in a relatively shorter idle timer duration when the display status of the UE 115-*a* is off (e.g., disabled). Such a shorter idle timer may enable the UE 115-*a* to initiate a connection release procedure (e.g., transmitting a UAI requesting a connection release) relatively quicker when the display is off, resulting in reduced energy consumption at the UE 115-*a*, or the UE 115-*a* may initiate the connection release procedure relatively slower when the display is on, resulting in more reliable communications (e.g., the UE 115-*a* may maintain the communications link with the base station 105-*a* for a longer timer period), among other examples. In some examples, a display status of the UE 115-*a* may change while the idle timer is running. For example, the UE 115-*a* may adjust the display status (e.g., turn the display on or off) during the duration of the idle timer. The UE 115-*a* may restart the idle timer, use a new duration of the idle timer (e.g., a duration of a corresponding display status adjusted by an amount of time elapsed using the duration of the previous display status), or both, as described herein.

Additionally or alternatively, the duration of the idle timer may be based on a battery status of the UE 115-*a*. For example, a relatively shorter time period (e.g., value of T) may be used if the battery level of the UE 115-*a* is low (e.g., if the UE 115-*a* is in a low power mode), which may result in improved battery life. Alternatively, a relatively higher time period may be used if the battery level of the UE 115-*a* is high, which may result in relatively more reliable communications.

Accordingly, the UE may transmit a UAI message upon expiration of the idle timer, for example, if a timer T346*f* is not running (e.g., if the timer T346*f* has expired or has not been initiated). In other words, the expiration of the idle timer may be an example of a trigger for transmitting one or more uplink messages 220 (e.g., UAI messages) as part of a connection release procedure. Additionally or alternatively, the UE 115-*a* may transmit the UAI message based on one or more other triggers, such as a launched state of an application. For example, the UE 115-*a* may refrain from taking one or more actions of a connection release procedure if an application is open (e.g., in a launched state), which may enable more reliable communications associated with the application (e.g., an application with relatively low latency requirements or an application with a relatively high likelihood of data communications, such as gaming applications). The UE 115-*a* may initiate the connection release procedure upon detecting that the application is closed (e.g., the application is not in a launched state). As an example, the UE 115-*a* may start the idle timer if the application is closed and/or the UE 115-*a* does not have further data to communicate. As another example, the UE 115-*a* may allow the idle timer to run when the application is open, and the UE 115-*a* may refrain from taking an action (e.g., transmitting a UAI message) until the application is closed. In some examples, the UE 115-*a* may determine the state of the application using an application identifier (ID) (e.g., a modem can detect the launch state of the application using the application ID). In some examples, a modem may include or be included in a communications manager within the UE 115-*a*, which may be an example of a communications manager 715, communications manager 815, communications manager 905, or communications manager 1010 as described herein.

The UE 115-*a* may monitor for a downlink message 215 from the base station 105-*a* in response to transmitting an uplink message 220. In some examples, the UE 115-*a* may receive a downlink message 215 and release the connection in accordance with the downlink message 215 (e.g., an RRC release message). In some other examples, the UE 115-*a* may fail to receive the downlink message 215 for a duration of the T346*f* timer. In some examples, the UE 115-*a* may determine whether a quantity of transmitted UAI message satisfies a threshold. If the threshold is not satisfied, the UE 115-*a* may transmit another UAI message and restart the T346*f* timer, the idle timer, the data inactivity timer, or any combination thereof. If the threshold is satisfied, the UE 115-*a* may refrain from transmitting further UAI messages based on the satisfied threshold, which may allow the UE 115-*a* to release the connection by allowing the data inactivity timer to expire (e.g., by refraining from transmitting UAI messages, the UE 115-*a* may refrain from restarting the data inactivity timer based on sending a UAI message).

In some examples, the UE 115-*a* may enable or disable one or more connection release procedures based on the status of an application. For example, an application may signal status information (e.g., a status of the application) to trigger the UE 115-*a* to enable or disable one or more connection release procedures. In some cases, the status information may indicate a time interval (t) until a next data transmission may occur, which may include indicating the time of the next data transmission, a duration of time until the next data transmission, or any combination thereof. Stated alternatively, the application may indicate the time to a next data transmission (e.g., a next traffic burst, a predicted data communication, among other examples of data transmissions) associated with the application. In some examples, the UE 115-*a* may determine whether the indicated time interval satisfies a threshold. If the threshold is satisfied, the UE 115-*a* may enable one or more connection release procedures. For example, the UE 115-*a* may transmit a UAI message requesting a connection release based on the satisfied threshold, based on a T346*f* timer, an idle timer, a data inactivity timer, or any combination thereof. In some other examples, if the threshold is not satisfied the UE 115-*a* may disable one or more connection release procedures and, for example, refrain from transmitting a UAI message requesting a connection release. For example, if the timer to a next traffic burst (or any data transmission associated with the application) is relatively small, the UE 115-*a* may not send a UAI message to request connection release. Thus, the UE 115-*a* may implement logic to enable or disable a condition to send UAI as described by the various examples described herein. Stated alternatively, the UE 115-*a* may enable a connection release procedure as described herein based on a third duration (e.g., the duration corresponding to a time until an uplink transmission for an application of the UE is communicated) satisfying a threshold (e.g., a threshold duration associated with a latency condition of the application).

In some examples, the UE 115-*a* may use a common threshold for multiple applications, the UE 115-*a* may use multiple thresholds for multiple applications (e.g., different respective threshold for different applications), or a combination thereof. In some examples, a threshold may be included in the status information signaled by a respective application. For example, the application may indicate the threshold to a modem of the UE 115-*a* (e.g., a threshold associated with the application). Additionally or alternatively, a threshold of an application may be pre-configured at the UE 115-*a* (e.g., the UE 115-*a* may use a default threshold for one or more applications). In some cases, the threshold may depend on the application ID. For example, applications may indicate or otherwise be associated with respective thresholds according to application-specific latency requirements. As an illustrative example, latency sensitive applications may correspond to a relatively large threshold (e.g., relative to latency tolerant applications) to avoid a connection release between the UE 115-*a* and the network. By using a relatively large threshold for an application, the UE 115-*a* may avoid releasing a connection which may improve latency of communications associated with the application. Alternatively, by using a relatively small threshold for an application, the UE 115-*a* may save power by releasing a connection if the time to a next data transmission of the application is relatively large.

In some examples, one or more applications may determine that multiple data transmissions are to occur at different time intervals (e.g., 10 seconds and 20 seconds, though any interval of time may be used). For example, multiple applications may each have one or more data transmissions (e.g., traffic bursts) and an associated time for communicating the data transmissions. In some such examples, the one or more applications may aggregate the time intervals and indicate a minimum (e.g., smallest) time interval (e.g., 10 seconds) to the UE 115-*a* (e.g., to a modem within the UE communications). For example, an application may aggregate (e.g., identify) all the times at which an application expects to communicate data (e.g., t(i) for an application i). The application may indicate a threshold time of the aggregated times (e.g., a minimum time), such as the smallest time duration of the aggregated time durations, to a modem of the UE 115-*a*. By the applications indicating a single threshold time, the UE 115-*a* may experience reduced signaling overhead relative to the applications indicating each of the aggregated times. Alternatively, in some examples, the UE 115-*a* may receive the multiple time intervals and determine the minimum (e.g., smallest) time interval among the multiple time intervals, and the UE 115-*a* may compare the minimum time interval to the operative threshold. The UE 115-*a* may determine whether the operative threshold time interval (as indicated to the UE 115-*a* or as determined by the UE 115-*a*) satisfies a threshold. In some instances, if the operative threshold time interval satisfies one or more thresholds, the UE 115-*a* may enable one or more connection release procedures. In some other instances, if the threshold time interval fails to satisfy one or more thresholds, the UE 115-*a* may disable one or more connection release procedures and, for example, refrain from transmitting a UAI message requesting a connection release.

Figure 3:
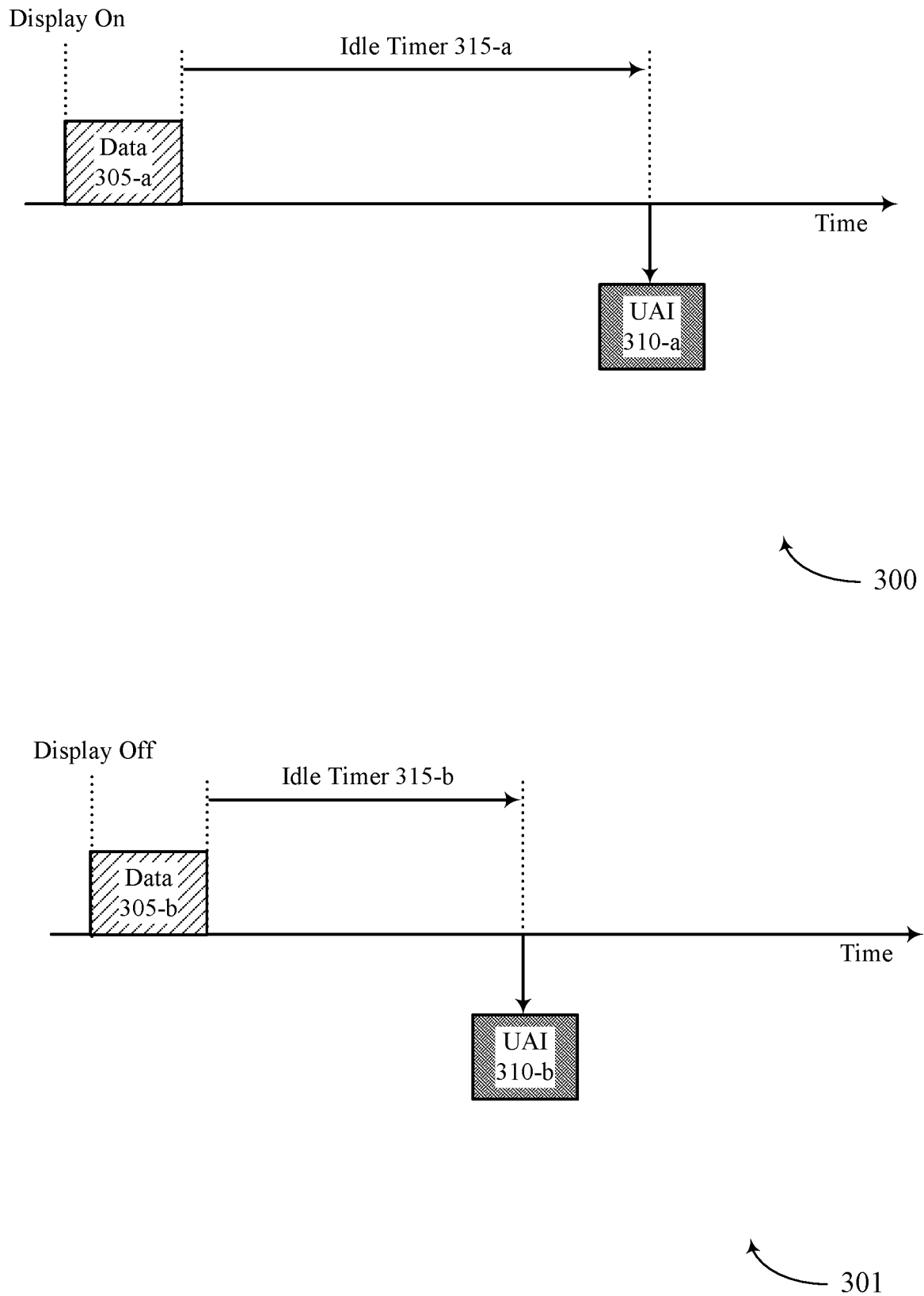
FIGS. 3-5 illustrate examples of timelines that supports enhanced connection release techniques for wireless communications systems in accordance with aspects of the present disclosure.

FIG. 3 illustrates examples of timelines 300 and 301 that support enhanced connection release techniques for wireless communications systems in accordance with aspects of the present disclosure. In some examples, the timelines 300 and 301 may implement aspects of wireless communications systems 100 and 200. Generally, the timelines 300 and 301 may illustrate the implementation of idle timers 315 by a UE 115, which may be an example of the corresponding device as described with reference to FIGS. 1 and 2.

The timeline 300 may illustrate an example of an idle timer 315-*a* implemented when a display status of a UE is enabled (e.g., the display is on). For example, the UE may communicate (e.g., receive or transmit) data 305-*a* and initiate the idle timer 315 at the end of communicating the data 305-*a* (e.g., based on identifying an inactivity period with no further data 305 to communicate). The UE may transmit the UAI 310-*a* based on one or more triggers (e.g., the expiration of the idle timer 315-*a*, a launch state of an application, or a combination thereof). For example, the UE may transmit the UAI 310-*a* after a duration of the idle timer 315-*a*. In some examples, the UE may determine the duration of the idle timer 315-*a* based on the display status of the UE 115 (e.g., a smart phone display status). For example, the timeline 300 may illustrate an idle timer 315-*a* when the display of the UE is enabled (e.g., the idle timer 315-*a* may have a duration of T1).

The timeline 301 may illustrate an example of an idle timer 315-*b* implemented when a display status of the UE is disabled (e.g., the display is off). For example, the UE may communicate data 305-*b* and initiate the idle timer 315-*b*. The duration of the idle timer 315-*b* may be based on one or more factors. For example, the duration of the idle timer 315-*b* may be determined based on the display status of the UE being disabled (e.g., the idle timer 315-*b* may have a duration of T2). As illustrated, the duration of the idle timer 315-*b* may be shorter than the duration of the idle timer 315-*a*, which may result in a relatively shorter idle timer duration when the display status of the UE is off (e.g., disabled). Such a shorter duration may enable the UE to initiate a connection release procedure (e.g., transmitting a UAI 310 requesting a connection release) relatively quicker when the display is off, resulting in reduced energy consumption at the UE, or the UE may initiate the connection release procedure relatively slower when the display is on, resulting in more reliable communications (e.g., the UE may maintain the communications link with the base station for a longer timer period), among other examples.

Additionally or alternatively, the duration of the idle timers 315 may be based on a battery status of the UE. For example, the timeline 300 may illustrate an example of a longer duration of the idle timer 315-*a* being used if a battery level is relatively high and the timeline 400 may illustrate an example of a shorter duration of the idle timer 315-*b* being used if the UE determines that the battery level is relatively low (e.g., if the UE 115-*a* is in a low power mode), which may result in improved battery life and/or reliable communications, among other benefits.

Figure 4:
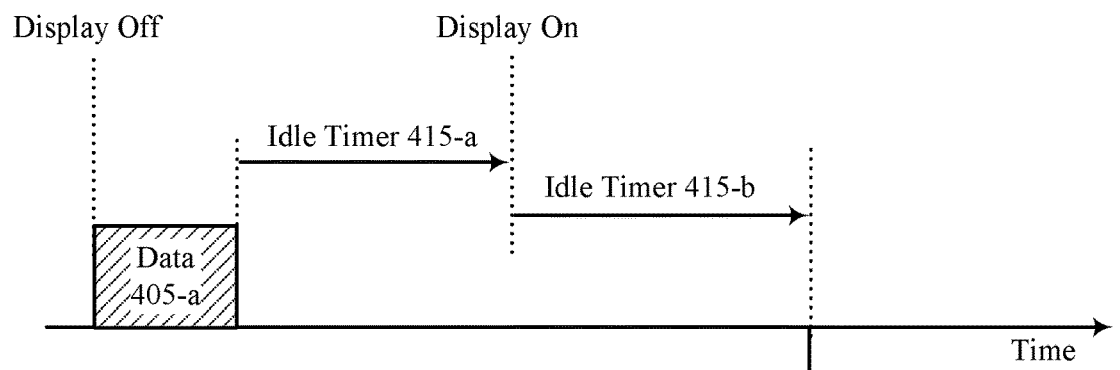
Figure 4:
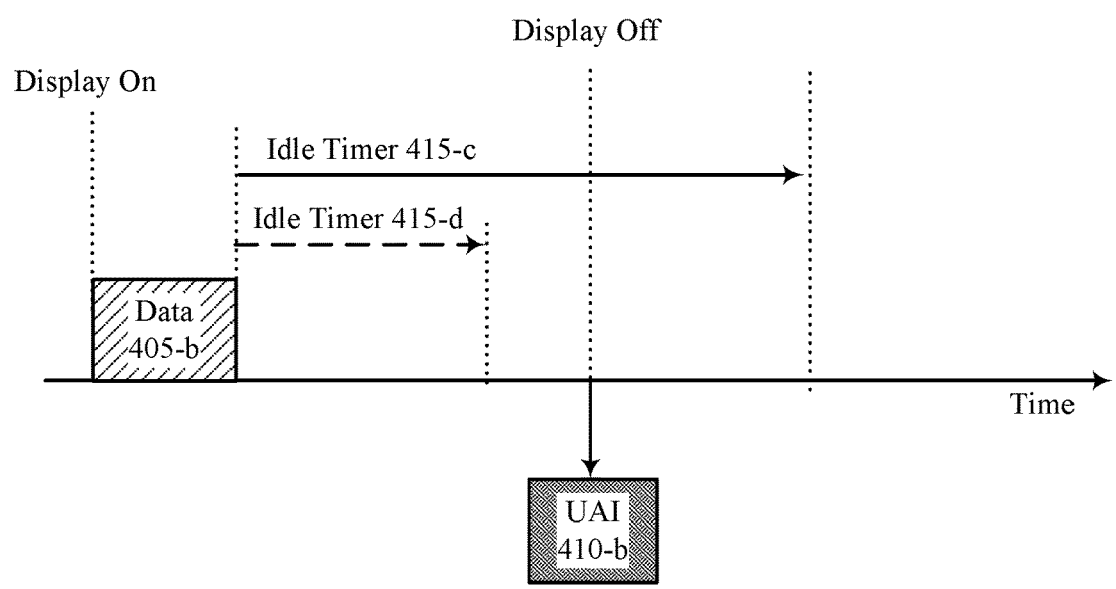

FIG. 4 illustrates examples of timelines 400 and 401 that support enhanced connection release techniques for wireless communications systems in accordance with aspects of the present disclosure. In some examples, the timelines 400 and 401 may implement aspects of wireless communications systems 100 and 200. Generally, the timelines 400 and 401 may illustrate the implementation of idle timers 415 by a UE 115, which may be an example of the corresponding device as described herein.

The timeline 400 may illustrate an example of adjusting a duration of an idle timer 415-*a* to a duration of an idle timer 415-*b* based on a status change (e.g., a display status change or a battery status change). For example, a UE may communicate (e.g., receive or transmit) data 405-*a* and initiate the idle timer 415-*a* based on the display of the UE being off. Prior to the expiration of the idle timer 415-*a*, the UE may detect a change in the status of the UE (e.g., a display change from off to on). The UE may adjust the duration of the idle timer 415 based on the detected change. For example, the idle timer 415-*a* may have a duration relatively shorter (e.g., corresponding to a display status of off) than the idle timer 415-*b* (e.g., corresponding to a display status of on). The UE may implement the idle timer 415-*b* based on the detected change of the display status from off to on (e.g., disabled to enabled). In some examples, the UE may reset the idle timer 415-*a* and initiate the idle timer 415-*b* (e.g., the UE may refrain from transmitting the UAI 410-*a* for an entire duration of the idle timer 415-*b* associated with a display status of on). In some other examples, the UE may use a "new" timer reduced by the time elapsed by the "old" timer. For example, the UE may refrain from transmitting the UAI 410-*a* for the duration of the idle timer 415-*b* reduced by the amount of time that the idle timer 415-*a* was running. Stated alternatively, the UE may extend the duration of the idle timer 415-*a* to the duration of the idle timer 415-*b*.

The timeline 401 may illustrate another example of adjusting a duration of an idle timer 415 based on a status change (e.g., a display status change or a battery status change). For example, a UE may communicate (e.g., receive or transmit) data 405-*b* and initiate the idle timer 415-*c* based on the display of the UE being on (e.g., the idle timer 415-*c* may correspond to a display being enabled). Prior to the expiration of the idle timer 415-*c*, the UE may detect a change in the status of the UE (e.g., a display change from on to off). The UE may adjust the duration of the idle timer 415 based on the detected change. For example, the idle timer 415-*c* may have a duration relatively longer (e.g., corresponding to a display status of on) than the idle timer 415-*d* (e.g., corresponding to a display status of off). The UE may implement the idle timer 415-*d* based on the detected change of the display status from on to off (e.g., enabled to disabled). In some examples, the UE may reset the idle timer 415-*c* and initiate the idle timer 415-*d* from the point that the status change was detected (e.g., the UE may refrain from transmitting the UAI 410-*b* for an entire duration of the idle timer 415-*d* starting at the "display off" point of the timeline 401). In some other examples, the UE may switch to the idle timer 415-*d*. For example, the UE may refrain from transmitting the UAI 410-*b* for the duration of the idle timer 415-*d* starting from the initiation of the idle timer 415-*c*. In some examples, the duration of the idle timer 415-*d* corresponding to the off display state may have expired prior to the change in the display status to off. In such examples, the UE may transmit the UAI 410-*b* based on the expiration of the idle timer 415-*d*, among other examples of triggers (e.g., in addition or alternative to an application launch state).

Additionally or alternatively, the duration of the idle timers 415 may be based on a battery status of the UE (e.g., the display status changes may additionally or alternatively represent battery status changes from a relatively high battery status to a relatively low battery status), as described herein.

Figure 5:
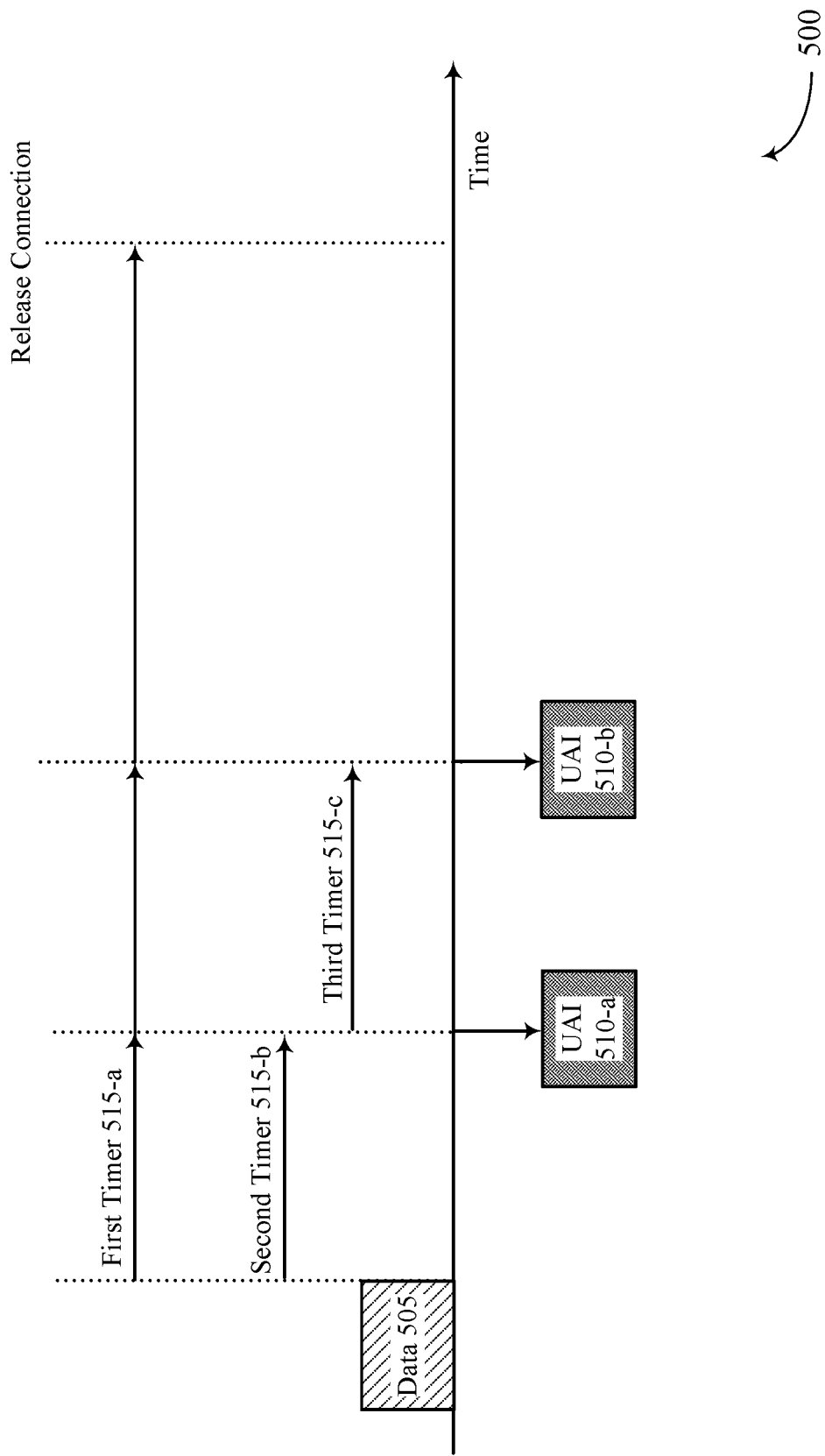

FIG. 5 illustrates an example of a timeline 500 that supports enhanced connection release techniques for wireless communications systems in accordance with aspects of the present disclosure. In some examples, the timeline 500 implement aspects of wireless communications systems 100 and 200. Generally, the timeline 500 may illustrate an example implementation of one or more timers for a connection release procedure that supports coexistence of a data inactivity timer and an idle timer, as described herein.

The timeline 500 may include data 505, which may illustrate an example of a data communication between a UE and a base station as described herein. For example, the UE may communicate (e.g., receive or transmit) data 505 and initiate the first timer 515-*a* and the second timer 515-*b* based on identifying an inactivity period (e.g., the UE may identify that there is not further data communications subsequent to the data 505). The first timer 515-*a* may be an example of a data inactivity timer (e.g., configured via RRC signaling) and the second timer 515-*b* may be an example of an idle timer as described herein.

The UE may identify one or more triggers for transmitting the UAI 510-*a*, which may be an example of an uplink message requesting a connection release as described herein. For example, the UE may transmit the UAI 510-*a* in response to an expiration of the second timer 515-*b*, a launch state of an application of the UE, or a combination thereof. The UE may transmit the UAI 510-*a* to the base station and initiate a third timer 515-*c*, which may be an example of a T346*f* timer (e.g., configured via RRC signaling) as described herein. In some examples, the UE may restart the first timer 515-*a* (e.g., the UAI 510-*a* may be identified as data activity and thus the data inactivity timer may be restarted upon transmission of the UAI 510-*a*), the UE may restart the second timer 515-*b* (e.g., in addition or alternative to the third timer 515-*c*), or any combination thereof. The UE may monitor for a downlink message from the base station in response to the UAI 510-*a* (e.g., an RRC release message) indicating to release the connection. As illustrated, the UE may fail to receive the downlink message for the duration of the third timer 515-*c* and may transmit the UAI 510-*b* based on an expiration of the third timer 515-*c*. Additionally or alternatively, the UE may restart the first timer 515-*a* based on transmitting the UAI 510-*b*. In some examples, the UE may repeat such operations. For example, the UE may continue to transmit UAIs 510 (spaced according to the duration of the third timer 515-*c*) and monitor for responses.

In some examples, the UE may determine that a quantity of transmitted UAIs 510 satisfy a threshold (e.g., a threshold of two UAIs 510 in the timeline 500, although any quantity may be used). For example, if the UE does not receive a RRC release message after sending N (e.g., N greater or equal to 1, among other values) UAIs 510 indicating a release preference, the UE may refrain from sending further UAIs 510 (e.g., the UE may refrain from restarting the third timer 515-*c* and transmitting further UAIs 510 based on the satisfied threshold of N UAIs 510). Such a threshold may enable the UE to release the connection based on an expiration of the first timer 515-*a* (e.g., the UE may autonomously release the connection upon the expiration of the first timer 515-*a*). The timeline 500 may realize one or more potential advantages. For example, the UE may be enabled to attempt connection release via network command (e.g., via an RRC release message) while ensuring that the UE may also use the inactivity timer after a quantity of attempts.

Figure 6:
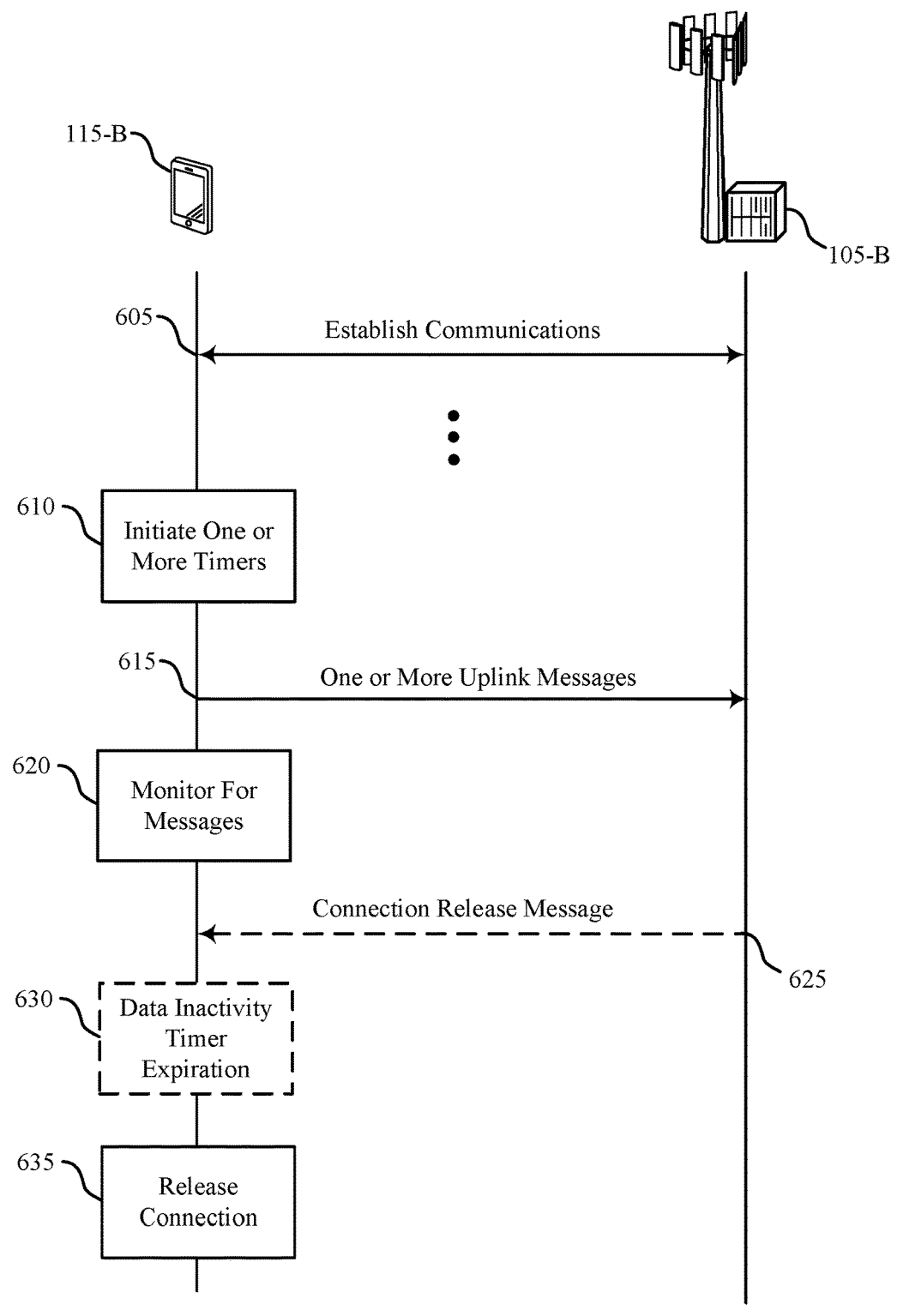
FIG. 6 illustrates an example of a process flow that supports enhanced connection release techniques for wireless communications systems in accordance with aspects of the present disclosure.

FIG. 6 illustrates an example of a process flow 600 that supports enhanced connection release techniques for wireless communications systems in accordance with aspects of the present disclosure. In some examples, the process flow 600 may implement aspects of wireless communications system 100. For example, the process flow 600 includes a UE 115-*b* and base station 105-*b*, which may be examples of the corresponding devices described herein with reference to FIGS. 1-5. The process flow 600 may illustrate the use of one or more timers (e.g., an idle timer) for a connection release procedure.

At 605, the UE 115-*b* and the base station 105-*b* may establish communications. For example, the UE 115-*b* may send a capability message and the base station 105-*b* may send control signaling (e.g., RRC setup or RRC reconfiguration signaling) as described herein with reference to FIG. 2. In some examples, the control signaling may configure the UE 115-*b* with one or more timers (e.g., the control signaling may indicate a data inactivity timer with a first duration or the control signaling may configure a T346*f* timer).

At 610, the UE 115-*b* may initiate one or more timers. For example, the UE 115-*b* may identify an inactivity period (e.g., a period without data to communicate) and initiate an idle timer (e.g., a second timer) with a second duration based on the identified inactivity period. In some examples, the duration of the idle timer may be based on one or more parameters as described herein with reference to FIGS. 1-5

(e.g., one or more statuses of the UE 115-*b*, a scaling parameter, the first duration of the data inactivity timer, among other examples). In some examples, the UE 115-*b* may initiate the data inactivity timer based on the identified inactivity period.

At 615, the UE 115-*b* may transmit one or more uplink messages to the base station 105-*b*. For example, the UE 115-*b* may identify one or more triggers, such as an expiration of the idle timer, a launch state of an application, or both, among other examples of triggers. The UE 115-*b* may transmit a UAI message based on the one or more triggers. The UE 115-*b* may initiate or restart one or more timers (e.g., the idle timer, the T346*f* timer, or both).

At 620, the UE 115-*b* may monitor for downlink messages from the base station 105-*b*. In some examples, at 625, the base station 105-*b* may transmit a connection release message (e.g., an RRC release message as described herein with reference to FIG. 2). In such examples, at 635 the UE 115-*b* may release a connection in accordance with the received connection release message 625 (e.g., the UE 115-*b* may enter an idle state, an out of connected state, or an inactive state).

In some other examples, at 620 the UE 115-*b* may fail to receive a downlink message for a duration of the T346*f* timer (e.g., the base station may fail to receive the UAI message, or the base station may fail to decode or process the UAI message before an expiration of the T346*f* timer). In some examples, the UE 115-*b* may repeat steps 615 and 620 (e.g., the UE 115-*b* may transmit another UAI message after an expiration of the idle timer) until the UE 115-*b* receives a connection release message or the UE 115-*b* determines that a quantity of UAI messages satisfies a threshold.

In some examples, at 630 the UE 115-*b* may identify an expiration of the data inactivity timer. For example, the UE 115-*b* may refrain from repeating step 615 (e.g., the UE 115-*b* may refrain from transmitting further UAI messages) based on the quantity of UAI messages satisfying the threshold, which may enable the data inactivity timer to expire as described herein.

At 635, the UE 115-*b* may release the connection with the base station 105-*b*. For example, the UE 115-*b* may release the connection in response to the connection release message as described above, or the UE 115-*b* may autonomously release the connection based on the expiration of the data inactivity timer.

Figure 7:
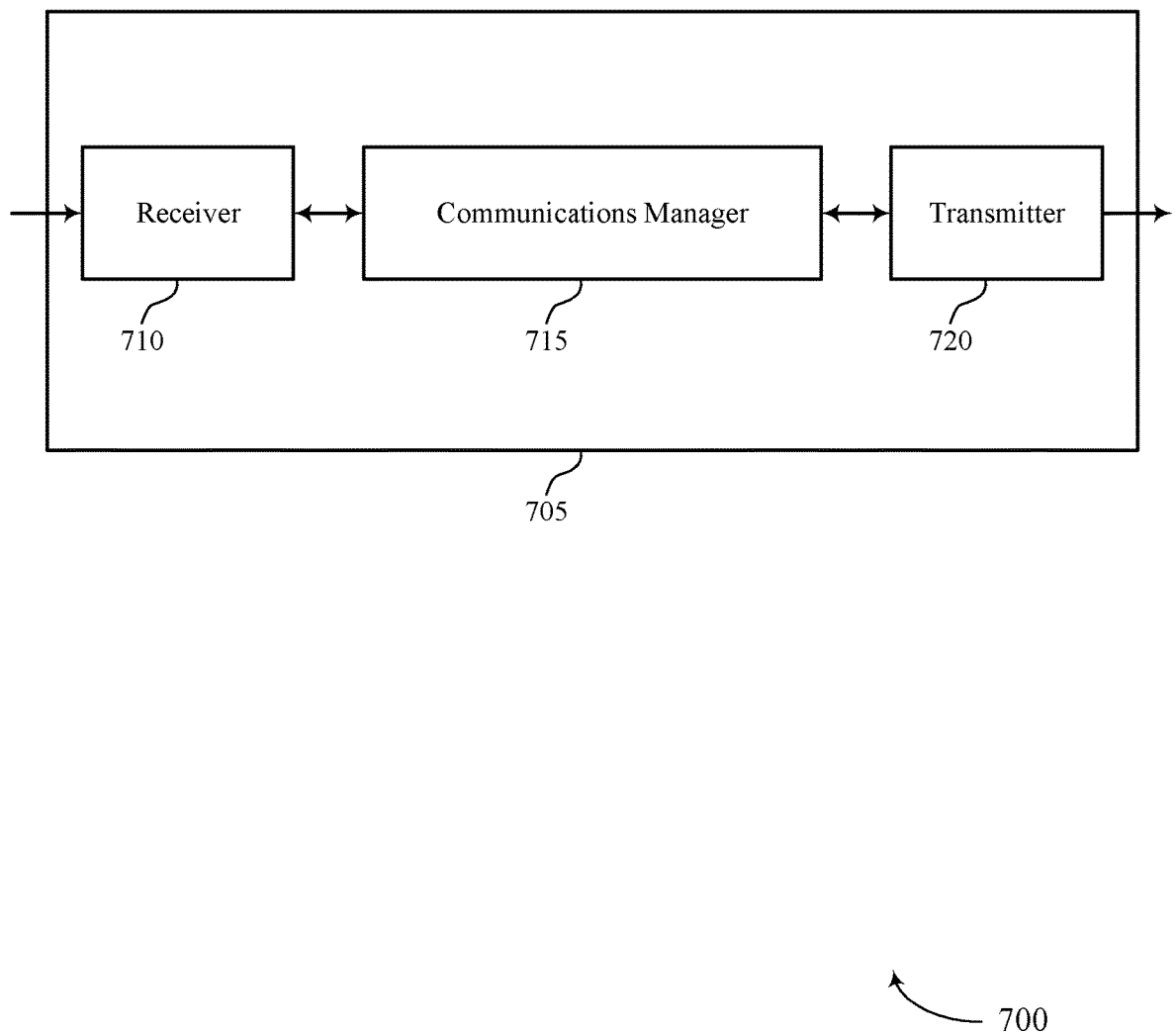
FIGS. 7 and 8 show block diagrams of devices that support enhanced connection release techniques for wireless communications systems in accordance with aspects of the present disclosure.

FIG. 7 shows a block diagram 700 of a device 705 that supports enhanced connection release techniques for wireless communications systems in accordance with aspects of the present disclosure. The device 705 may be an example of aspects of a UE 115 as described herein. The device 705 may include a receiver 710, a communications manager 715, and a transmitter 720. The device 705 may also include at least one processor. Each of these components may be in communication with or otherwise coupled to one another (e.g., via one or more buses).

The receiver 710 may receive information such as packets, user data, or control information associated with various information channels (e.g., control channels, data channels, and information related to enhanced connection release techniques for wireless communications systems). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, control signaling for communications in a wireless communications system, the control signaling indicating a first duration for an inactivity timer, initiate the inactivity timer and a second timer based at least in part on a period of inactivity, the second timer having a second duration that is shorter than the first duration for the inactivity timer, and transmit, based at least in part on an expiration of the second timer, a first uplink message indicating a request to release a connection for the communications in the wireless communications system. The communications manager 715 may be an example of aspects of the communications manager 1010 described herein.

The communications manager 715, or its sub-components, may be implemented in hardware, software (e.g., executed by at least one processor), or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 715 as described herein may be implemented to realize one or more potential advantages. One implementation may allow the device 705 to more efficiently perform a connection release. For example, the device 705 may implement an idle timer (e.g., concurrently with a data inactivity timer) in order to reduce a time prior to releasing connection, which may result in power savings at the device 705.

Based on implementing the various timers and schemes as described herein, a processor of a UE 115 (e.g., controlling the receiver 710, the transmitter 720, or the transceiver 1020) may reduce a processing overhead and improve communications efficiency at the UE 115 and/or a base station 105.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
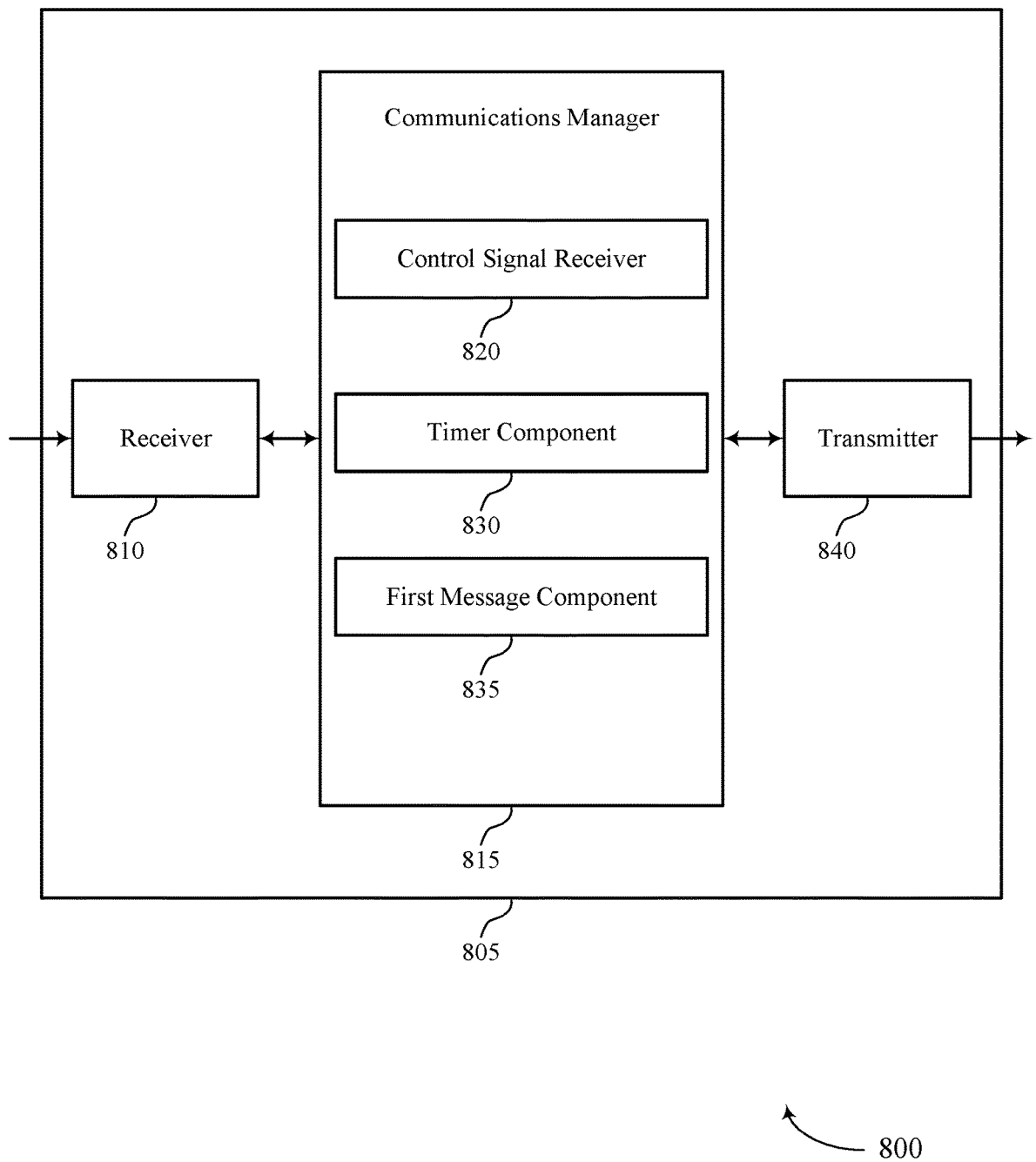

FIG. 8 shows a block diagram 800 of a device 805 that supports enhanced connection release techniques for wireless communications systems in accordance with aspects of the present disclosure. The device 805 may be an example of aspects of a device 705, or a UE 115 as described herein. The device 805 may include a receiver 810, a communications manager 815, and a transmitter 840. The device 805 may also include at least one processor. Each of these components may be in communication with or otherwise coupled to one another (e.g., via one or more buses).

The receiver 810 may receive information such as packets, user data, or control information associated with various information channels (e.g., control channels, data channels, and information related to enhanced connection release techniques for wireless communications systems). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control signal receiver 820, a timer component 830, and a first message component 835. The communications manager 815 may be an example of aspects of the communications manager 1010 described herein.

The control signal receiver 820 may receive, from a base station, control signaling for communications in a wireless communications system, the control signaling indicating a first duration for an inactivity timer.

The timer component 830 may initiate the inactivity timer and a second timer based on identifying the period of inactivity, the second timer having a second duration that is shorter than the first duration for the inactivity timer.

The first message component 835 may transmit, based at least in part on an expiration of the second timer, a first uplink message indicating a request to release a connection for the communications in the wireless communications system The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
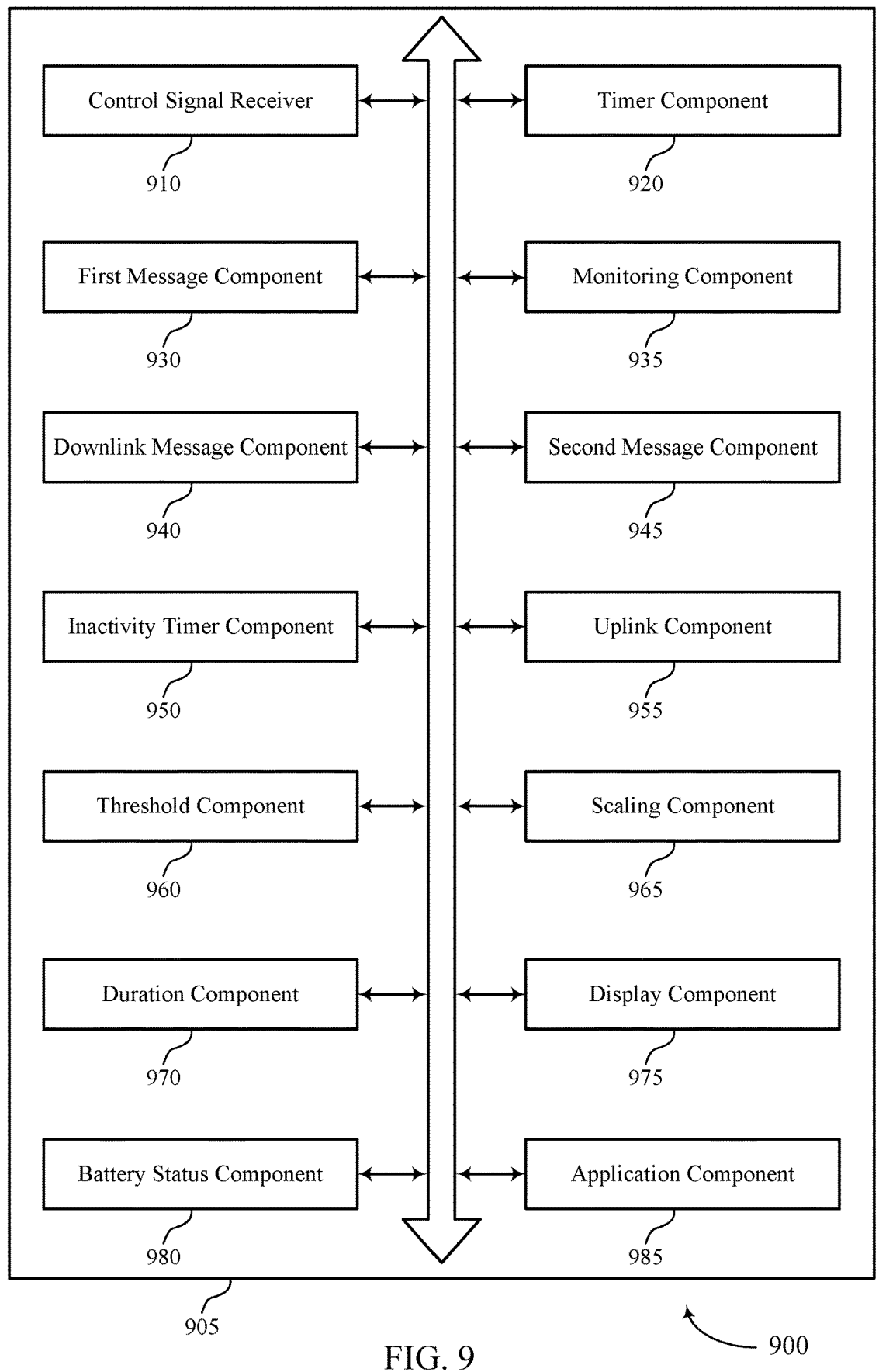
FIG. 9 shows a block diagram of a communications manager that supports enhanced connection release techniques for wireless communications systems in accordance with aspects of the present disclosure.

FIG. 9 shows a block diagram 900 of a communications manager 905 that supports enhanced connection release techniques for wireless communications systems in accordance with aspects of the present disclosure. The communications manager 905 may be an example of aspects of a communications manager 715, a communications manager 815, or a communications manager 1010 described herein. The communications manager 905 may include a control signal receiver 910, a timer component 920, a first message component 930, a monitoring component 935, a downlink message component 940, a second message component 945, an inactivity timer component 950, an uplink component 955, a threshold component 960, a scaling component 965, a duration component 970, a display component 975, a battery status component 980, and an application component 985. Each of these modules may communicate, directly or indirectly, with one another (e.g., via one or more buses).

The control signal receiver 910 may receive, from a base station, control signaling for communications in a wireless communications system, the control signaling indicating a first duration for an inactivity timer.

The timer component 920 may initiate the inactivity timer and a second timer based on identifying the period of inactivity, the second timer having a second duration that is shorter than the first duration for the inactivity timer.

In some examples, the timer component 920 may initiate a third timer based on transmitting the first uplink message.

In some examples, the timer component 920 may identify an expiration of the third timer.

In some examples, the timer component 920 may initiate the second timer based on identifying that the application of the UE is closed.

In some examples, the timer component 920 may restart the second timer based on transmitting the first uplink message. The second message component 945 may transmit a second uplink message indicating the request to release the connection based at least in part on a second expiration of the second timer after restarting the second timer, an expiration of a third timer, or a combination thereof.

The first message component 930 may transmit, based on the expiration of the second timer, a first uplink message indicating a request to release the connection.

In some cases, the first uplink message includes a UE assistance information message, the third timer includes a release preference prohibit timer, the downlink message includes a radio resource control message, the control signaling indicates the third duration of the third timer, or any combination thereof.

The monitoring component 935 may monitor, for a third duration of the third timer, for a downlink message from the base station based on transmitting the first uplink message.

The downlink message component 940 may receive the downlink message from the base station based on the monitoring, where releasing the connection for the communications is based on receiving the downlink message.

The second message component 945 may transmit a second uplink message indicating the request to release the connection based on the expiration of the third timer and failing to receive the downlink message in the third duration of the third timer.

The inactivity timer component 950 may identify the expiration of the inactivity timer, where releasing the connection for the communications is in response to the expiration of the inactivity timer.

In some examples, the inactivity timer component 950 may restart the inactivity timer after each of the quantity of uplink messages.

The uplink component 955 may transmit a quantity of uplink messages each indicating a respective request to release the connection.

In some examples, the uplink component 955 may refrain from transmitting an additional uplink message indicating the request to release the connection based on identifying that the quantity of uplink messages satisfies the threshold, where identifying the expiration of the inactivity timer is based on refraining from transmitting the additional uplink message.

In some examples, the uplink component 955 may refrain from transmitting, in response to the expiration of the second timer, the first uplink message indicating the request to release the connection while the application of the UE is open.

In some examples, the uplink component 955 may transmit the first uplink message based on identifying that the application of the UE is closed.

The threshold component 960 may identify that the quantity of uplink messages satisfies a threshold.

The threshold component 960 may determine that the third duration satisfies a threshold duration.

The threshold component 960 may enable a connection release procedure based on the third duration satisfying the threshold, the connection release procedure including initiating the second timer and transmitting the first uplink message.

In some examples, the threshold component 960 may identify the threshold duration based on an application identifier of the application, the threshold duration corresponding to a latency tolerance associated with the application.

In some examples, the threshold component 960 may identify, for a plurality of applications of the UE, a plurality of durations each associated with a respective time until a respective uplink transmission for a respective application of the plurality of applications, where identifying the third duration includes identifying a smallest duration of the plurality of durations as the third duration.

In some examples, the threshold component 960 may receive, at a modem of the UE from one or more applications of the UE, an indication of a third duration, an indication of the threshold duration, or any combination thereof.

The scaling component 965 may apply a scaling factor to the first duration for the inactivity timer.

The duration component 970 may determine the second duration for the second timer based on applying the scaling factor to the first duration.

The duration component 970 may identify a third duration corresponding to a time until an uplink transmission for an application of the UE.

In some examples, the duration component 970 may identify a maximum duration for the second timer.

In some examples, the duration component 970 may compare the candidate duration to the maximum duration, where determining the second duration for the second timer is based on the comparing.

In some examples, the duration component 970 may adjust the second duration for the second timer based on the change in the display status.

The display component 975 may identify whether a display of the UE is enabled or disabled, where the second duration for the second timer is based on whether the display is enabled or disabled.

In some examples, the display component 975 may identify, after initiating the second timer, a change in a display status of the UE, where the display status corresponds to whether the display is enabled or disabled.

The battery status component 980 may identify a status of a battery for the UE, where the second duration for the second timer is based on the status of the battery.

The application component 985 may identify that an application of the UE is closed based on an identifier of the application, where releasing the connection is based on identifying that the application of the UE is closed.

Figure 10:
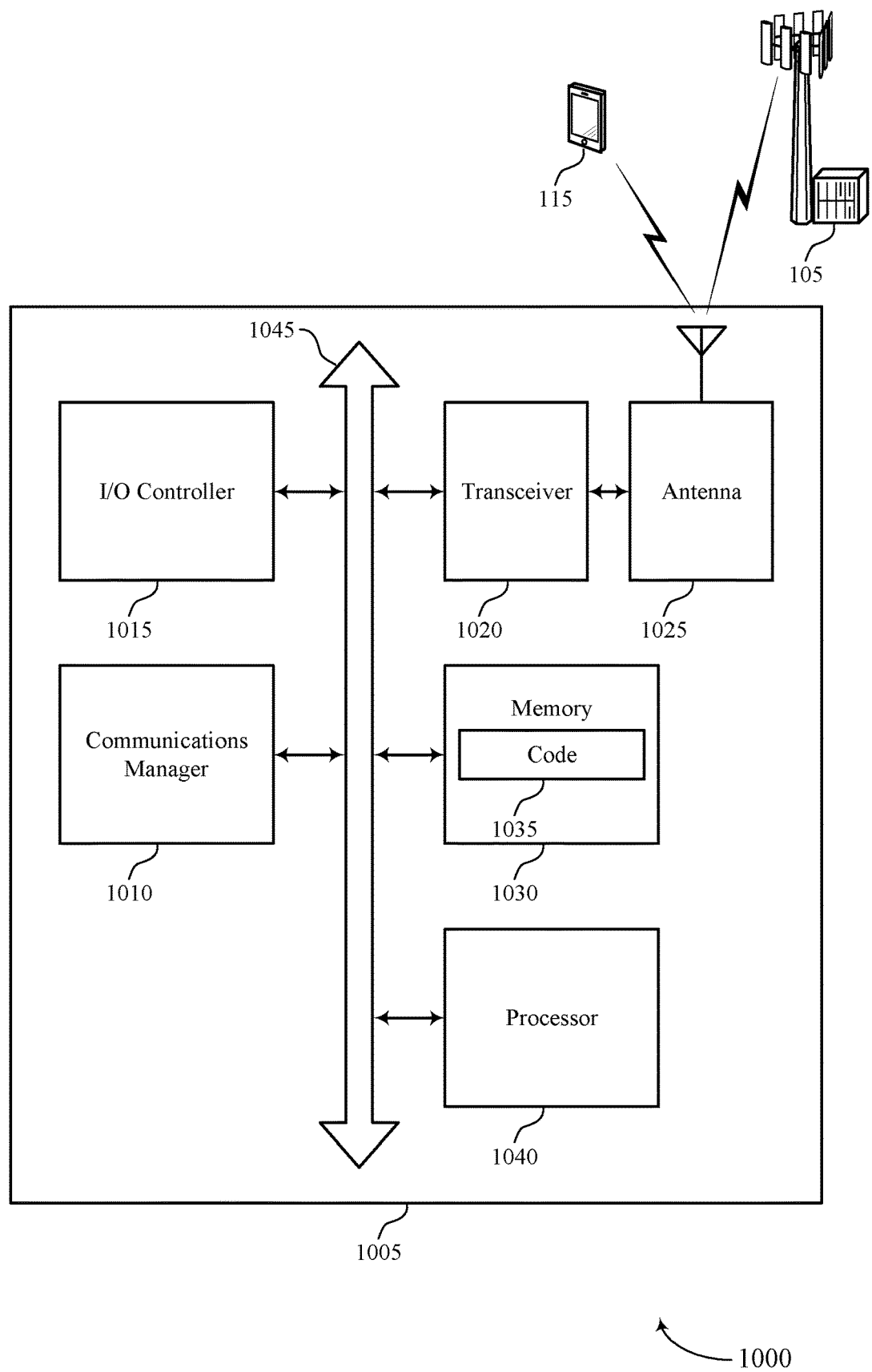
FIG. 10 shows a diagram of a system including a device that supports enhanced connection release techniques for wireless communications systems in accordance with aspects of the present disclosure.

FIG. 10 shows a diagram of a system 1000 including a device 1005 that supports enhanced connection release techniques for wireless communications systems in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, control signaling for communications in a wireless communications system, the control signaling indicating a first duration for an inactivity timer, initiate the inactivity timer and a second timer based on identifying the period of inactivity, the second timer having a second duration that is shorter than the first duration for the inactivity timer, and transmit, based at least in part on an expiration of the second timer, a first uplink message indicating a request to release a connection for the communications in the wireless communications system.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, n FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced connection release techniques for wireless communications systems).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
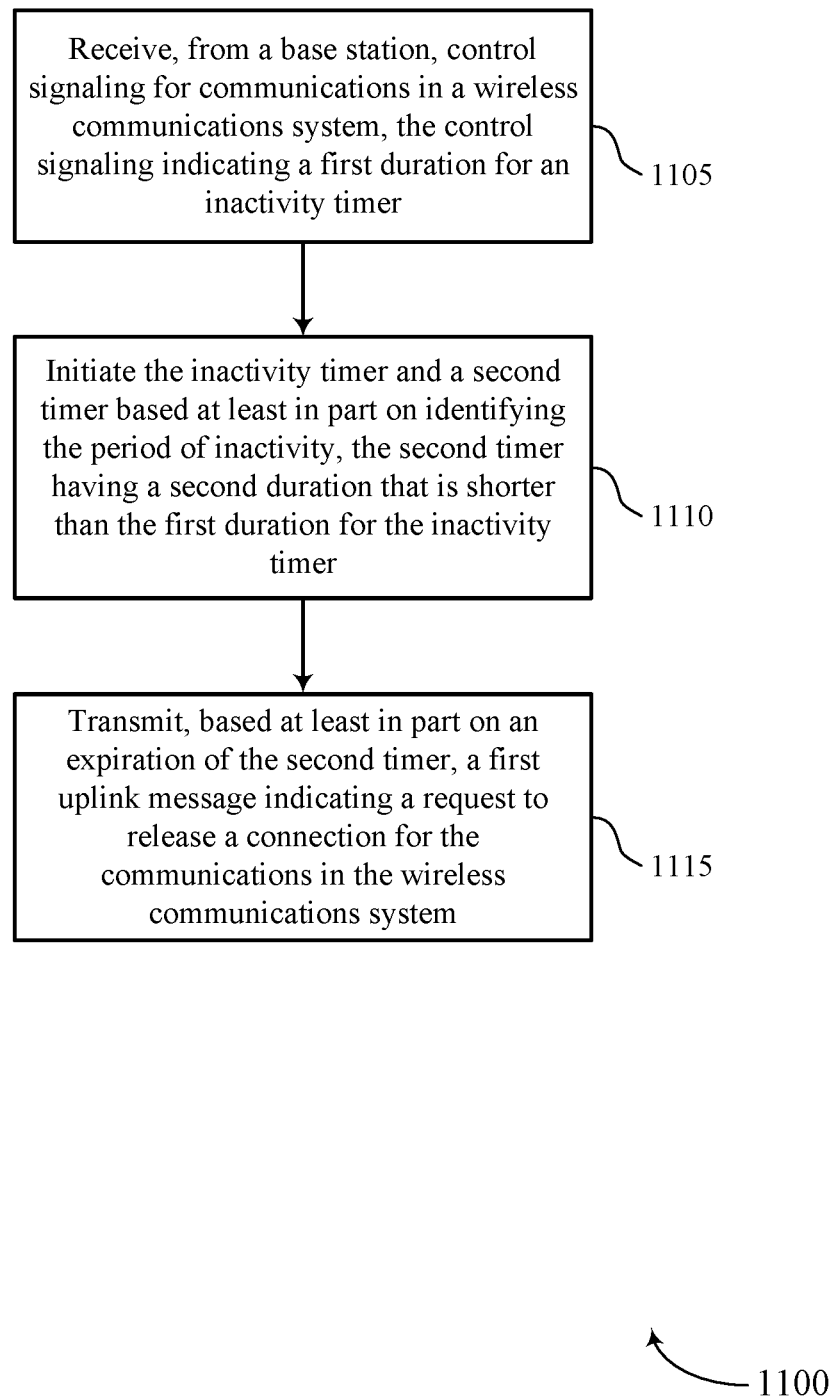
FIGS. 11 and 12 show flowcharts illustrating methods that support enhanced connection release techniques for wireless communications systems in accordance with aspects of the present disclosure.

FIG. 11 shows a flowchart illustrating a method 1100 that supports enhanced connection release techniques for wireless communications systems in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive, from a base station, control signaling for communications in a wireless communications system, the control signaling indicating a first duration for an inactivity timer. The operations of 1105 may be performed according to the methods described herein. In some examples, aspects of the operations of 1105 may be performed by a control signal receiver as described with reference to FIGS. 7 through 10.

At 1110, the UE may initiate the inactivity timer and a second timer based at least in part on identifying the period of inactivity, the second timer having a second duration that is shorter than the first duration for the inactivity timer. The operations of 1110 may be performed according to the methods described herein. In some examples, aspects of the operations of 1110 may be performed by a timer component as described with reference to FIGS. 7 through 10.

At 1115, the UE may transmit, based at least in part on an expiration of the second timer, a first uplink message indicating a request to release a connection for the communications in the wireless communications system. The operations of 1115 may be performed according to the methods described herein. In some examples, aspects of the operations of 1115 may be performed by a first message component as described with reference to FIGS. 7 through 10.

Figure 12:
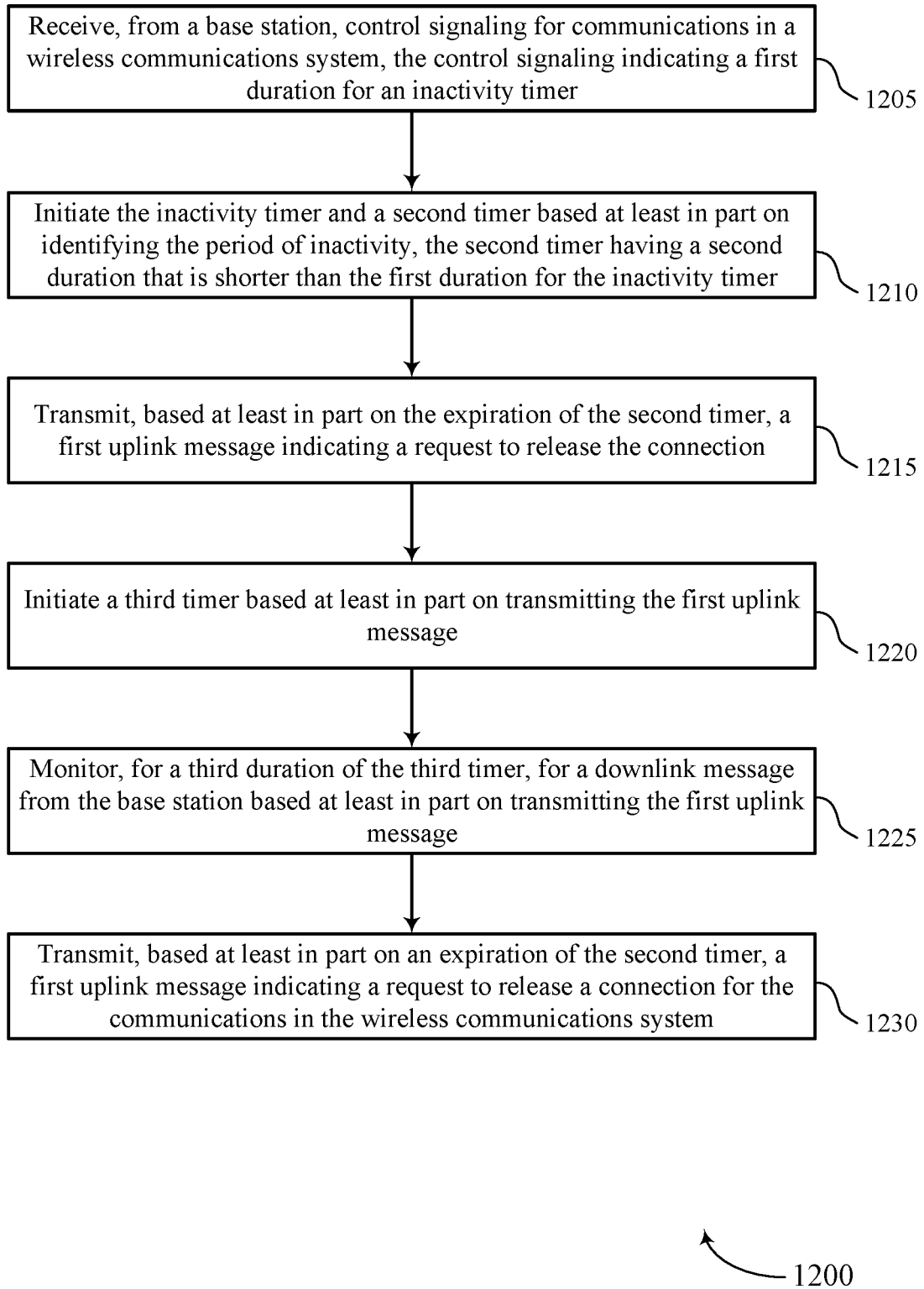

FIG. 12 shows a flowchart illustrating a method 1200 that supports enhanced connection release techniques for wireless communications systems in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, control signaling for communications in a wireless communications system, the control signaling indicating a first duration for an inactivity timer. The operations of 1205 may be performed according to the methods described herein. In some examples, aspects of the operations of 1205 may be performed by a control signal receiver as described with reference to FIGS. 7 through 10.

At 1210, the UE may initiate the inactivity timer and a second timer based at least in part on identifying the period of inactivity, the second timer having a second duration that is shorter than the first duration for the inactivity timer. The operations of 1210 may be performed according to the methods described herein. In some examples, aspects of the operations of 1210 may be performed by a timer component as described with reference to FIGS. 7 through 10.

At 1215, the UE may transmit, based at least in part on the expiration of the second timer, a first uplink message indicating a request to release the connection. The operations of 1215 may be performed according to the methods described herein. In some examples, aspects of the operations of 1215 may be performed by a first message component as described with reference to FIGS. 7 through 10.

At 1220, the UE may initiate a third timer based at least in part on transmitting the first uplink message. The operations of 1220 may be performed according to the methods described herein. In some examples, aspects of the operations of 1220 may be performed by a timer component as described with reference to FIGS. 7 through 10.

At 1225, the UE may monitor, for a third duration of the third timer, for a downlink message from the base station based at least in part on transmitting the first uplink message. The operations of 1225 may be performed according to the methods described herein. In some examples, aspects of the operations of 1225 may be performed by a monitoring component as described with reference to FIGS. 7 through 10.

At 1230, the UE may transmit, based at least in part on an expiration of the second timer, a first uplink message indicating a request to release a connection for the communications in the wireless communications system. The operations of 1230 may be performed according to the methods described herein. In some examples, aspects of the operations of 1230 may be performed by a first message component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, control signaling for communications in a wireless communications system, the control signaling indicating a first duration for an inactivity timer; initiating the inactivity timer and a second timer based at least in part on a period of inactivity, the second timer having a second duration that is shorter than the first duration for the inactivity timer; and transmitting, based at least in part on an expiration of the second timer, a first uplink message indicating a request to release a connection for the communications in the wireless communications system.

Aspect 2: The method of aspect 1, further comprising: initiating a third timer based at least in part on transmitting the first uplink message; and monitoring, for a third duration of the third timer, for a downlink message from the base station based at least in part on transmitting the first uplink message.

Aspect 3: The method of aspect 2, further comprising: receiving the downlink message from the base station based at least in part on the monitoring; and releasing the connection for the communications based at least in part on receiving the downlink message.

Aspect 4: The method of aspect 2, further comprising: identifying an expiration of the third timer; and transmitting a second uplink message indicating the request to release the connection based at least in part on the expiration of the third timer and failing to receive the downlink message in the third duration of the third timer.

Aspect 5: The method of any of aspects 2 through 4, wherein the first uplink message comprises a UE assistance information message, the third timer comprises a release preference prohibit timer, the downlink message comprises a radio resource control message, the control signaling indicates the third duration of the third timer, or any combination thereof.

Aspect 6: The method of any of aspects 1 through 5, further comprising: identifying an expiration of the inactivity timer; and releasing the connection for the communications in response to the expiration of the inactivity timer.

Aspect 7: The method of aspect 6, further comprising: transmitting a quantity of uplink messages each indicating a respective request to release the connection; restarting the inactivity timer after each of the quantity of uplink messages; identifying that the quantity of uplink messages satisfies a threshold; and refraining from transmitting an additional uplink message indicating the request to release the connection based at least in part on identifying that the quantity of uplink messages satisfies the threshold, wherein identifying the expiration of the inactivity timer is based at least in part on refraining from transmitting the additional uplink message.

Aspect 8: The method of any of aspects 1 through 7, further comprising: restarting the second timer based at least in part on transmitting the first uplink message; and transmitting a second uplink message indicating the request to release the connection based at least in part on a second expiration of the second timer after restarting the second timer, an expiration of a third timer, or a combination thereof.

Aspect 9: The method of any of aspects 1 through 8, further comprising: applying a scaling factor to the first duration for the inactivity timer; and determining the second duration for the second timer based at least in part on applying the scaling factor to the first duration.

Aspect 10: The method of aspect 9, wherein applying the scaling factor to the first duration yields a candidate duration for the second timer, the method further comprising: identifying a maximum duration for the second timer; and comparing the candidate duration to the maximum duration, wherein determining the second duration for the second timer is based at least in part on the comparing.

Aspect 11: The method of any of aspects 1 through 10, further comprising: identifying whether a display of the UE is enabled or disabled, wherein the second duration for the second timer is based at least in part on whether the display is enabled or disabled.

Aspect 12: The method of aspect 11, further comprising: identifying, after initiating the second timer, a change in a display status of the UE, wherein the display status corresponds to whether the display is enabled or disabled; and adjusting the second duration for the second timer based at least in part on the change in the display status.

Aspect 13: The method of any of aspects 1 through 12, further comprising: identifying a status of a battery for the UE, wherein the second duration for the second timer is based at least in part on the status of the battery.

Aspect 14: The method of any of aspects 1 through 13, further comprising: identifying that an application of the UE is closed based at least in part on an identifier of the application; and releasing the connection based at least in part on identifying that the application of the UE is closed.

Aspect 15: The method of aspect 14, wherein initiating the second timer is based at least in part on identifying that the application of the UE is closed.

Aspect 16: The method of any of aspects 14 through 15, further comprising: refraining from transmitting, in response to the expiration of the second timer, the first uplink message indicating the request to release the connection while the application of the UE is open; and transmitting the first uplink message based at least in part on identifying that the application of the UE is closed.

Aspect 17: The method of any of aspects 1 through 16, further comprising: identifying a third duration corresponding to a time until an uplink transmission for an application of the UE; determining that the third duration satisfies a threshold duration; and enabling a connection release procedure based at least in part on the third duration satisfying the threshold duration, the connection release procedure comprising initiating the second timer and transmitting the first uplink message.

Aspect 18: The method of aspect 17, further comprising: identifying the threshold duration based at least in part on an application identifier of the application, the threshold duration corresponding to a latency tolerance associated with the application.

Aspect 19: The method of aspect 18, further comprising: identifying, for a plurality of applications of the UE, a plurality of durations each associated with a respective time until a respective uplink transmission for a respective application of the plurality of applications, wherein identifying the third duration comprises identifying a smallest duration of the plurality of durations as the third duration.

Aspect 20: The method of any of aspects 17 through 19, further comprising: receiving, at a modem of the UE from one or more applications of the UE, an indication of the third duration, an indication of the threshold duration, or any combination thereof.

Aspect 21: An apparatus for wireless communications at a UE, comprising at least one processor; memory coupled with the at least one processor; and instructions stored in the memory and executable by the at least one processor to cause the apparatus to perform a method of any of aspects 1 through 20.

Aspect 22: An apparatus for wireless communications at a UE, comprising at least one means for performing a method of any of aspects 1 through 20.

Aspect 23: A non-transitory computer-readable medium storing code for wireless communications at a UE, the code comprising instructions executable by at least one processor to perform a method of any of aspects 1 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment, comprising:
   receiving, from a network entity, control signaling for communications in a wireless communications system, the control signaling indicating a first duration for a first inactivity timer;
   initiating a second timer, wherein the second timer has a second duration that is based at least in part on a display on/off status of the user equipment;
   transmitting, in response to an expiration of the second timer, a first uplink message indicating a request to release a connection for the communications in the wireless communications system;
   initiating a third timer in response to transmitting the first uplink message; and
   releasing a connection for the communications in the wireless communications system based at least in part on an expiration of the third timer.

2. The method of claim 1, wherein the third timer comprises a release preference prohibit timer.

3. The method of claim 1, further comprising:
monitoring, for a third duration of the third timer, for a downlink message from the network entity; and
receiving a downlink message from the network entity during the third duration of the third timer, wherein releasing the connection is based at least in part on receiving the downlink message.

4. The method of claim 1, further comprising:
monitoring, for a third duration of the third timer, for a downlink message from the network entity, wherein releasing the connection comprises autonomously releasing the connection based on not receiving a downlink message from the network entity during the third duration of the third timer.

5. The method of claim 1, further comprising:
identifying the expiration of the third timer; and
transmitting a second uplink message indicating a request to release the connection based at least in part on the expiration of the third timer and failing to receive a downlink message during a third duration of the third timer.

6. The method of claim 1, further comprising:
identifying, after initiating the second timer, a change in the display on/off status of the user equipment; and
adjusting the second duration for the second timer based at least in part on the change in the display on/off status.

7. The method of claim 1, further comprising:
identifying a status of a battery for the user equipment, wherein the second duration for the second timer is based at least in part on the status of the battery.

8. The method of claim 1, further comprising:
refraining, in response to the expiration of the second timer, transmission of the first uplink message while an application of the user equipment is open; and
identifying that the application of the user equipment is closed based at least in part on an identifier of the application, wherein transmitting the first uplink message is based at least in part on identifying that the application of the user equipment is closed.

9. The method of claim 1, further comprising:
applying a scaling factor to the first duration for the first inactivity timer; and
determining the second duration for the second timer based at least in part on applying the scaling factor to the first duration.

10. A user equipment, comprising:
one or more memories storing processor-executable code; and
one or more processors coupled with the one or more memories and individually or collectively operable to execute the code to cause the user equipment to:
receive, from a network entity, control signaling for communications in a wireless communications system, the control signaling indicating a first duration for a first inactivity timer;
initiate a second timer, wherein the second timer has a second duration that is based at least in part on a display on/off status of the user equipment;
transmit, in response to an expiration of the second timer, a first uplink message indicating a request to release a connection for the communications in the wireless communications system;
initiate a third timer in response to transmission of the first uplink message; and
release a connection for the communications in the wireless communications system based at least in part on an expiration of the third timer.

11. The user equipment of claim 10, wherein the third timer comprises a release preference prohibit timer.

12. The user equipment of claim 10, wherein the one or more processors are individually or collectively further operable to execute the code to cause the user equipment to:
monitor, for a third duration of the third timer, for a downlink message from the network entity; and
receive a downlink message from the network entity during the third duration of the third timer, wherein release of the connection is based at least in part on receiving the downlink message.

13. The user equipment of claim 10, wherein the one or more processors are individually or collectively further operable to execute the code to cause the user equipment to:
monitor, for a third duration of the third timer, for a downlink message from the network entity, wherein release of the connection is an autonomous release of the connection based on not receiving a downlink message from the network entity during the third duration of the third timer.

14. The user equipment of claim 10, wherein the one or more processors are individually or collectively further operable to execute the code to cause the user equipment to:
identify the expiration of the third timer; and
transmit a second uplink message indicating a request to release the connection based at least in part on the expiration of the third timer and failing to receive a downlink message during a third duration of the third timer.

15. The user equipment of claim 10, wherein the one or more processors are individually or collectively further operable to execute the code to cause the user equipment to:
identify, after initiating the second timer, a change in the display on/off status of the user equipment; and
adjust the second duration for the second timer based at least in part on the change in the display on/off status.

16. The user equipment of claim 10, wherein the one or more processors are individually or collectively further operable to execute the code to cause the user equipment to:
identify a status of a battery for the user equipment, wherein the second duration for the second timer is based at least in part on the status of the battery.

17. The user equipment of claim 10, wherein the one or more processors are individually or collectively further operable to execute the code to cause the user equipment to:
refrain, in response to the expiration of the second timer, the transmission of the first uplink message while an application of the user equipment is open; and
identify that the application of the user equipment is closed based at least in part on an identifier of the application, wherein transmission of the first uplink message is based at least in part on identifying that the application of the user equipment is closed.

18. The user equipment of claim 10, wherein the one or more processors are individually or collectively further operable to execute the code to cause the user equipment to:
apply a scaling factor to the first duration for the first inactivity timer; and
determine the second duration for the second timer based at least in part on applying the scaling factor to the first duration.

19. A non-transitory computer-readable medium storing code for wireless communications, the code comprising instructions executable by one or more processors to:
receive, at a user equipment from a network entity, control signaling for communications in a wireless communications system, the control signaling indicating a first duration for a first inactivity timer;

initiate a second timer, wherein the second timer has a second duration that is based at least in part on a display on/off status of the user equipment;

transmit, in response to an expiration of the second timer, a first uplink message indicating a request to release a connection for the communications in the wireless communications system;

initiate a third timer in response to transmission of the first uplink message; and release a connection for the communications in the wireless communications system based at least in part on an expiration of the third timer.

20. The non-transitory computer-readable medium of claim 19, wherein the third timer comprises a release preference prohibit timer.

21. The non-transitory computer-readable medium of claim 19, wherein the instructions are further executable by one or more processors to:

monitor, for a third duration of the third timer, for a downlink message from the network entity; and receive a downlink message from the network entity during the third duration of the third timer, wherein release of the connection is based at least in part on receiving the downlink message.

22. The non-transitory computer-readable medium of claim 19, wherein the instructions are further executable by one or more processors to:

monitor, for a third duration of the third timer, for a downlink message from the network entity, wherein release of the connection is an autonomous release of the connection based on not receiving a downlink message from the network entity during the third duration of the third timer.

23. The non-transitory computer-readable medium of claim 19, wherein the instructions are further executable by one or more processors to:

identify the expiration of the third timer; and transmit a second uplink message indicating a request to release the connection based at least in part on the expiration of the third timer and failing to receive a downlink message during a third duration of the third timer.

24. The non-transitory computer-readable medium of claim 19, wherein the instructions are further executable by one or more processors to:

identify, after initiating the second timer, a change in the display on/off status of the user equipment; and adjust the second duration for the second timer based at least in part on the change in the display status.

25. The non-transitory computer-readable medium of claim 19, wherein the instructions are further executable by one or more processors to:

identify a status of a battery for the user equipment, wherein the second duration for the second timer is based at least in part on the status of the battery.

26. The non-transitory computer-readable medium of claim 19, wherein the instructions are further executable by one or more processors to:

refrain, in response to the expiration of the second timer, the transmission of the first uplink message while an application of the user equipment is open; and identify that the application of the user equipment is closed based at least in part on an identifier of the application, wherein transmission of the first uplink message is based at least in part on identifying that the application of the user equipment is closed.

27. The non-transitory computer-readable medium of claim 19, wherein the instructions are further executable by one or more processors to:

apply a scaling factor to the first duration for the first inactivity timer; and determine the second duration for the second timer based at least in part on applying the scaling factor to the first duration.

28. A user equipment, comprising:

means for receiving, from a network entity, control signaling for communications in a wireless communications system, the control signaling indicating a first duration for a first inactivity timer;

means for initiating a second timer, wherein the second timer has a second duration that is based at least in part on a display on/off status of the user equipment;

means for transmitting, in response to an expiration of the second timer, a first uplink message indicating a request to release a connection for the communications in the wireless communications system;

means for initiating a third timer in response to transmitting the first uplink message; and means for releasing a connection for the communications in the wireless communications system based at least in part on an expiration of the third timer.

29. The user equipment of claim 28, wherein the third timer comprises a release preference prohibit timer.

30. The user equipment of claim 28, further comprising:

means for monitoring, for a third duration of the third timer, for a downlink message from the network entity; and means for receiving a downlink message from the network entity during the third duration of the third timer, wherein releasing the connection is based at least in part on receiving the downlink message.

* * * * *